(12) United States Patent
Leung et al.

(10) Patent No.: US 12,547,581 B2
(45) Date of Patent: Feb. 10, 2026

(54) CLUSTER-BASED PLACEMENT AND ROUTING OF MEMORY UNITS AND COMPUTE UNITS IN A RECONFIGURABLE COMPUTING GRID

(71) Applicant: SambaNova Systems, Inc., Palo Alto, CA (US)

(72) Inventors: Kin Hing Leung, Cupertino, CA (US); Feng Sheng, Palo Alto, CA (US); Ajit Punj, Palo Alto, CA (US)

(73) Assignee: SambaNova Systems, Inc., Palo Alto, CA (US)

( * ) Notice: Subject to any disclaimer, the term of this patent is extended or adjusted under 35 U.S.C. 154(b) by 0 days.

(21) Appl. No.: 18/922,873

(22) Filed: Oct. 22, 2024

(65) Prior Publication Data

US 2025/0045241 A1     Feb. 6, 2025

Related U.S. Application Data

(63) Continuation of application No. 18/083,362, filed on Dec. 16, 2022, now Pat. No. 12,147,381.

(60) Provisional application No. 63/397,522, filed on Aug. 12, 2022.

(51) Int. Cl.
  *G06F 15/80*      (2006.01)
  *G06F 15/78*      (2006.01)

(52) U.S. Cl.
  CPC ...... *G06F 15/8053* (2013.01); *G06F 15/7871* (2013.01)

(58) Field of Classification Search
  CPC .................................................. G06F 15/7871
  See application file for complete search history.

(56) References Cited

U.S. PATENT DOCUMENTS

| 7,653,662 B2 | 1/2010 | Mizutani et al. |
| 11,204,889 B1 | 12/2021 | Prabhakar et al. |
| 11,237,880 B1 * | 2/2022 | Raumann ............ G06N 3/0499 |

(Continued)

FOREIGN PATENT DOCUMENTS

WO       2010142987 A1     12/2010

OTHER PUBLICATIONS

Koeplinger et al., Spatial: A Language and Compiler for Application Accelerators, PLDI '18, Jun. 18-22, 2018, Association for Computng Machinery, 16 pages.

(Continued)

*Primary Examiner* — Michael J Metzger
(74) *Attorney, Agent, or Firm* — Flagship Patents; Sikander M. Khan; Bruce A. Young

(57) ABSTRACT

A method for optimizing the placement and routing of compute units and memory units within a reconfigurable computing grid is disclosed. The method involves obtaining a hardware description of the computing grid, receiving a placement graph for a computing task, forming subgraphs for unplaced memory units with primary connections, assigning subgraphs as clusters on the grid, and generating a configuration file for a physical reconfigurable processor. By strategically placing clusters on the grid and configuring the processor based on the logical representation, efficient execution of reconfigurable computing tasks is achieved. This method enhances the performance and flexibility of reconfigurable computing systems by streamlining the allocation of compute and memory resources.

20 Claims, 17 Drawing Sheets

(56) References Cited

U.S. PATENT DOCUMENTS

| | | |
|---|---|---|
| 11,237,971 B1 | 2/2022 | Brown et al. |
| 11,429,349 B1 | 8/2022 | Oklobdzija et al. |
| 11,443,014 B1 | 9/2022 | Wang et al. |
| 2007/0198971 A1 | 8/2007 | Dasu et al. |
| 2016/0323143 A1 | 11/2016 | Kim et al. |
| 2020/0241844 A1 | 7/2020 | Koeplinger et al. |
| 2020/0272779 A1* | 8/2020 | Boesch ............... G06N 3/0495 |
| 2021/0357475 A1 | 11/2021 | Wang et al. |
| 2021/0373867 A1 | 12/2021 | Chen et al. |
| 2022/0092247 A1 | 3/2022 | Koeplinger et al. |
| 2023/0214307 A1 | 7/2023 | Khankin |

OTHER PUBLICATIONS

Podobas et al, A Survey on Coarse-Grained Reconfigurable Architectures From a Performance Perspective, IEEEAccess, vol. 2020. 3012084, Jul. 27, 2020, 25 pages.

Prabhakar et al., Plasticine: A Reconfigurable Architecture for Parallel Patterns, ISCA, Jun. 24-28, 2017, 14 pages.

Zhang et al., "SARA: Scaling a Reconfigurable Dataflow Accelerator," 2021 ACM/IEEE 48th Annual International Symposium on Computer Architecture (ISCA), 2021, pp. 1041-1054.

\* cited by examiner

User Program Statements — 710, 712

Linear = torch.nn.linear(K,N)
Relu = torch.nn.relu
Softmax = torch.nn.Softmax(dim=3)
X1 = torch.randn(N, C, M, K)
X2 = X1.to("RDP")
X3 = Linear(X2)
X4 = Relu(X3)
X5 = Softmax(X4)
X6 = X5.to("CPU")

User Program Compute Graph — 715

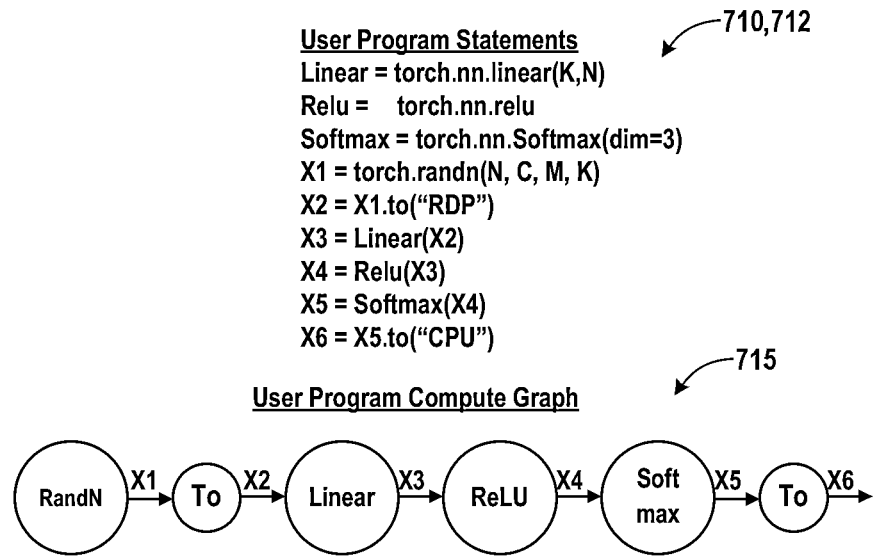

FIG. 7A

Air/Tensor Statements — 720

| Air/Tensor Statements | Tensor Size | |
|---|---|---|
| %1 = air.Input(name: "In0"): | NxCxMxK bf16 | |
| %2 = air.Linear(%1): | NxCxMxN bf16 | |
| %3 = air.ReLU(%2): | NxCxMxN bf16 | |
| %4 = air.Exp(%3): | NxCxMxN bf16 | ⎫ |
| %5 = air.Sum(%4, dim: 3): | NxCxMx1 bf16 | ⎬ Softmax lowering |
| %6 = air.Div(%4, %5): | NxCxMxN bf16 | ⎭ |
| %7 = air.Output(%6) | | |

Air/Tensor Compute Graph — 725

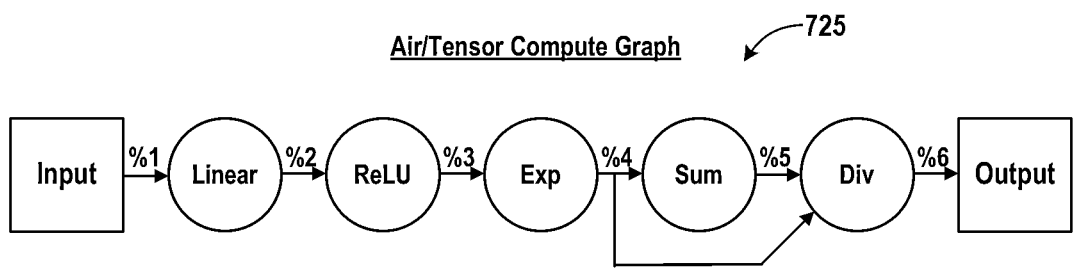

Template Dataflow Statements     Tensor Size

```
%1 = tlir.Region(name: "In0"):        NxCxMxK bf16
%2 = tlir.Region(name: "Weight"):     KxN bf16
%3 = tlir.Region(name: "Bias"):       1xN bf16
%4 = tlir.Region(name: "Out0"):       NxCxMxN bf16
%5 = tlir.Load(%2)
%6 = tlir.Load(%3)         ─732
%7 = tlir.MetaPipeline(iters: N) {
    %8 = tlir.Load(%1, dim: 1):       CxMxK bf16
    %9 = tlir.Buffer(%5, depth: 2):─732  CxMxK bf16
    %10 = tlir.MetaPipeline(iters: C) {
        %11 = tlir.ReadSlice(%9, dim: 1):   MxK bf16
        %12 = tlir.Linear(%5, %11):         MxN bf16
        %13 = tlir.Buffer(%12, depth: 2):   MxN bf16
        %14 = tlir.AddBias(%13, %6):        MxN bf16
        %15 = air.ReLU(%14):                MxN bf16
        %16 = air.Exp(%15):                 MxN bf16
        %17 = tlir.Buffer(%16, depth: 2):   MxN bf16
        %18 = tlir.Sum(%17, dim: 1):        Mx1 bf16
        %19 = tlir.Div(%17, %18):           MxN bf16
        %20 = tlir.Store(%4, %19)
    }
}
```

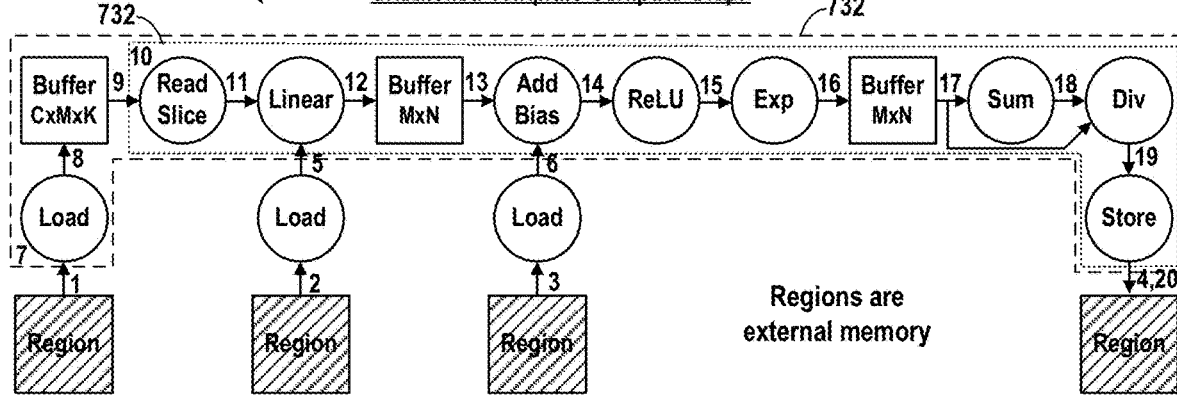

FIG. 7C

CLUSTER-BASED PLACEMENT AND ROUTING OF MEMORY UNITS AND COMPUTE UNITS IN A RECONFIGURABLE COMPUTING GRID

RELATED APPLICATIONS AND DOCUMENTS

This application is a continuation of U.S. patent application Ser. No. 18/083,362 filed on Dec. 16, 2022, entitled "Cluster-Based Placement and Routing of Memory Units and Compute Units in a Reconfigurable Computing Grid," which claims the benefit of U.S. Provisional Application 63/397,522 filed on Aug. 12, 2022 entitled "CLUSTER-BASED PLACEMENT AND ROUTING OF MEMORY UNITS AND COMPUTE UNITS IN A RECONFIGURABLE COMPUTING GRID."

This application is related to the following papers and commonly owned applications:

- Prabhakar et al., "Plasticine: A Reconfigurable Architecture for Parallel Patterns," ISCA '17, Jun. 24-28, 2017, Toronto, ON, Canada;
- Koeplinger et al., "Spatial: A Language And Compiler For Application Accelerators," Proceedings Of The 39th ACM SIGPLAN Conference On Programming Language Design And Embodiment (PLDI), Proceedings of the 43rd International Symposium on Computer Architecture, 2018;
- Zhang et al., "SARA: Scaling a Reconfigurable Dataflow Accelerator," 2021 ACM/IEEE 48th Annual International Symposium on Computer Architecture (ISCA), 2021, pp. 1041-1054;
- U.S. Nonprovisional patent application Ser. No. 16/260,548, filed Jan. 29, 2019, entitled "MATRIX NORMAL/TRANSPOSE READ AND A RECONFIGURABLE DATA PROCESSOR INCLUDING SAME," now U.S. Pat. No. 10,768,899;
- U.S. Nonprovisional patent application Ser. No. 15/930,381, filed May 12, 2020, entitled "COMPUTATIONALLY EFFICIENT GENERAL MATRIX-MATRIX MULTIPLICATION (GEMM)," now U.S. Pat. No. 11,250,105;
- U.S. Nonprovisional patent application Ser. No. 16/890,841, filed Jun. 2, 2020, entitled "ANTI-CONGESTION FLOW CONTROL FOR RECONFIGURABLE PROCESSORS," now U.S. Pat. No. 11,709,664;
- U.S. Nonprovisional patent application Ser. No. 17/023,015, filed Sep. 16, 2020, entitled "COMPILE TIME LOGIC FOR DETECTING STREAMING COMPATIBLE AND BROADCAST COMPATIBLE DATA ACCESS PATTERNS," now U.S. Pat. No. 11,237,971;
- U.S. Nonprovisional patent application Ser. No. 17/031,679, filed Sep. 24, 2020, entitled "SYSTEMS AND METHODS FOR MEMORY LAYOUT DETERMINATION AND CONFLICT RESOLUTION," now U.S. Pat. No. 11,645,057;
- U.S. Nonprovisional patent application Ser. No. 17/216,647, filed Mar. 29, 2021, entitled "TENSOR PARTITIONING AND PARTITION ACCESS ORDER," now U.S. Pat. No. 11,204,889;
- U.S. Provisional Patent Application No. 63/190,749, filed May 19, 2021, entitled "FLOATING POINT MULTIPLY-ADD, ACCUMULATE UNIT WITH CARRY-SAVE ACCUMULATOR;"
- U.S. Provisional Patent Application No. 63/174,460, filed Apr. 13, 2021, entitled "EXCEPTION PROCESSING IN CARRY-SAVE ACCUMULATION UNIT FOR MACHINE LEARNING;"
- U.S. Nonprovisional patent application Ser. No. 17/397,241, filed Aug. 9, 2021, entitled "FLOATING POINT MULTIPLY-ADD, ACCUMULATE UNIT WITH CARRY-SAVE ACCUMULATOR," now U.S. Pat. No. 11,429,349;
- U.S. Nonprovisional patent application Ser. No. 17/520,290, filed Nov. 5, 2021, entitled "SPARSE MATRIX MULTIPLIER IN HARDWARE AND A RECONFIGURABLE DATA PROCESSOR INCLUDING SAME," now U.S. Pat. No. 11,443,014.

All of the related application(s) and documents listed above are hereby incorporated by reference herein for all purposes.

BACKGROUND

The present subject matter relates to placing, routing and using compute units and memory units in a reconfigurable computing grid.

Reconfigurable processors, including field programmable gate arrays FPGAs, can be configured to implement a variety of functions more efficiently or faster than might be achieved using a general-purpose processor executing a computer program. So called coarse-grain reconfigurable architectures (e.g. CGRAs) are being developed in which the configurable units in the array are more complex than used in typical, more fine-grained FPGAs, and may enable faster or more efficient execution of various classes of functions. For example, CGRAs have been proposed that can enable implementation of energy-efficient accelerators for machine learning and artificial intelligence workloads. See, Prabhakar, et al., "Plasticine: A Reconfigurable Architecture for Parallel Patterns," ISCA '17, Jun. 24-28, 2017, Toronto, ON, Canada.

Despite the foregoing advances, the placement and routing (i.e., interconnection) of computational tasks on reconfigurable computing grids remains a challenge.

SUMMARY

A method for placing, routing and using compute units and memory units in a reconfigurable computing grid includes providing a reconfigurable computing grid comprising a grid of physical compute units and physical memory units interconnected with a switching fabric, each of the physical compute units comprises a primary port and one or more secondary ports, receiving a placement graph for a reconfigurable computing task that defines a set of unplaced memory units, a set of unplaced compute units and data connections between the unplaced memory units and the unplaced compute units, wherein the data connections comprise primary connections corresponding to the primary ports of the unplaced compute units and secondary connections corresponding to the secondary ports of the unplaced compute units.

The method also includes forming a subgraph for each unplaced memory unit having one or more primary connections, each subgraph comprising the unplaced memory unit and each unplaced compute unit connected to the unplaced memory unit via a primary connection and placing each formed subgraph as a cluster on the reconfigurable computing grid to produce placed clusters for the reconfigurable computing grid. A corresponding computer program product and system are also disclosed herein.

BRIEF DESCRIPTION OF THE DRAWINGS

FIGS. 7A-7E illustrate various representations of an example user program corresponding to various stages of a compiler stack such as the compiler stack of FIG. 6.

DETAILED DESCRIPTION

Figure 1:
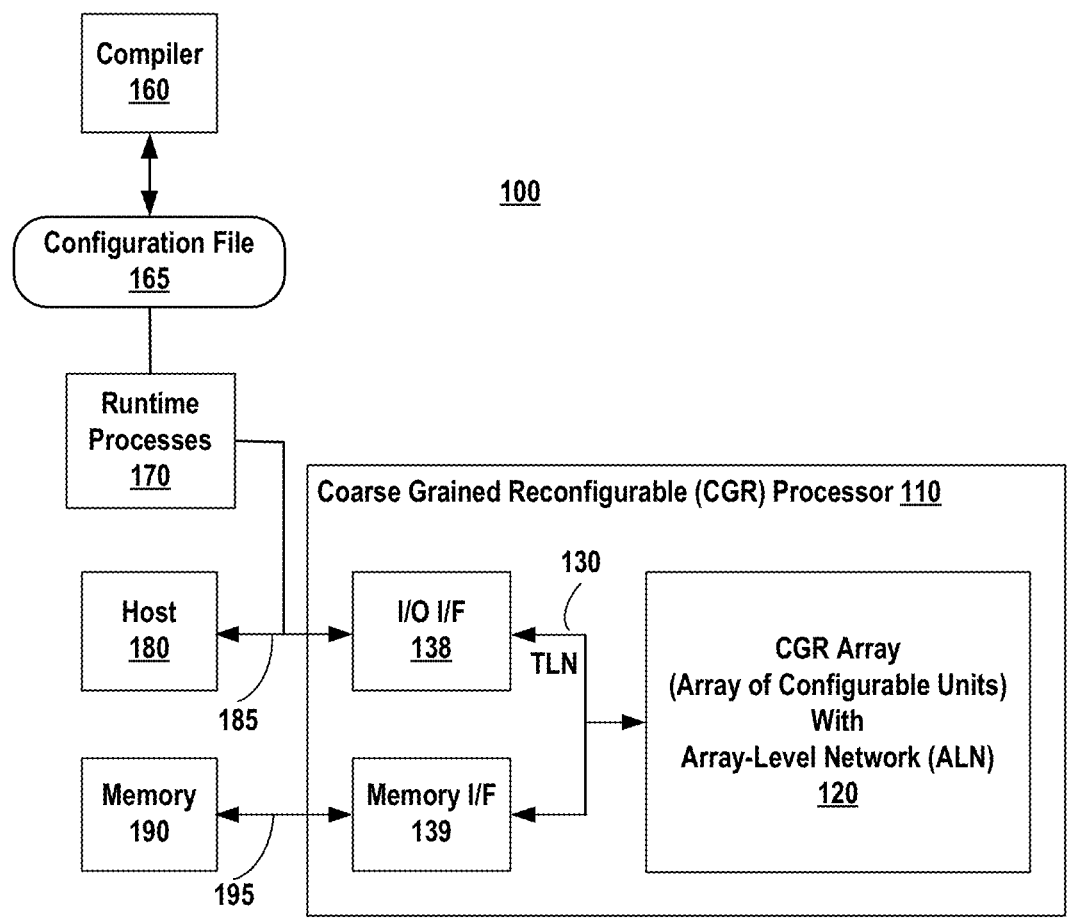
FIG. 1 illustrates an example system including a coarse-grained reconfigurable (CGR) processor, a host, and a memory.

The following detailed description is made with reference to the Figures. Example implementations are described to illustrate the technology disclosed, not to limit its scope, which is defined by the claims. Those of ordinary skill in the art will recognize a variety of equivalent variations on the description that follows.

FIGS. 1-9 depict at least one example of an environment wherein the disclosed technology may be deployed while FIGS. 10A-16B depict details on various examples of the disclosed technology.

Traditional compilers translate human-readable computer source code into machine code that can be executed on a Von Neumann computer architecture. In this architecture, a processor serially executes instructions in one or more threads of software code. The architecture is static, and the compiler does not determine how execution of the instructions is pipelined, or which processor or memory takes care of which thread. Thread execution is asynchronous, and safe exchange of data between parallel threads is not supported.

High-level programs for machine learning (ML) and artificial intelligence (AI) may require massively parallel computations, where many parallel and interdependent threads (meta-pipelines) exchange data. Such programs are ill-suited for execution on Von Neumann computers. They require architectures that are optimized for parallel processing, such as coarse-grained reconfigurable (CGR) architectures (CGRAs) or graphic processing units (GPUs). The ascent of ML, AI, and massively parallel architectures places new requirements on compilers, including how computation graphs, and in particular dataflow graphs, are pipelined, which operations are assigned to which compute units, how data is routed between various compute units and memory, and how synchronization is controlled particularly when a dataflow graph includes one or more nested loops, whose execution time varies dependent on the data being processed.

Terminology

As used herein, the phrase "one of" should be interpreted to mean exactly one of the listed items. For example, the phrase "one of A, B, and C" should be interpreted to mean any of: only A, only B, or only C.

As used herein, the phrases at least one of and one or more of should be interpreted to mean one or more items. For example, the phrase "at least one of A, B, and C" or the phrase "at least one of A, B, or C" should be interpreted to mean any combination of A, B, and/or C. The phrase "at least one of A, B, and C" means at least one of A and at least one of B and at least one of C.

Unless otherwise specified, the use of ordinal adjectives first, second, third, etc., to describe an object, merely refers to different instances or classes of the object and does not imply any ranking or sequence.

The following terms or acronyms used herein are defined at least in part as follows:

AGCU—address generator (AG) and coalescing unit (CU).

AI—artificial intelligence.

AIR—arithmetic or algebraic intermediate representation (notation).

ALN—array-level network.

Buffer—an intermediate storage of data.

CGR—coarse-grained reconfigurable. A property of, for example, a system, a processor, an architecture (see CGRA), an array, or a unit in an array. This property distinguishes the system, etc., from field-programmable gate arrays (FPGAs), which can implement digital circuits at the gate level and are therefore fine-grained configurable.

CGRA—coarse-grained reconfigurable architecture. A data processor architecture that includes one or more arrays (CGR arrays) of CGR units.

Compiler—a translator that processes statements written in a programming language to machine language instructions for a computer processor. A compiler may include multiple stages to operate in multiple steps. Each stage may create or update an intermediate representation (IR) of the translated statements. Compiler stages are illustrated with reference to FIG. 6.

Computation graph—some algorithms can be represented as computation graphs. As used herein, computation graphs are a type of directed graphs comprising nodes that represent mathematical operations/expressions and edges that indicate dependencies between the operations/expressions. For example, with machine learning (ML) algorithms, input layer nodes assign variables, output layer nodes represent algorithm outcomes, and hidden layer nodes perform operations on the variables. Edges represent data (e.g., scalars, vectors, tensors) flowing between operations. In addition to dependencies, the computation graph reveals which operations and/or expressions can be executed concurrently.

CGR unit—a circuit that can be configured and reconfigured to locally store data (e.g., a memory unit or a PMU), or to execute a programmable function (e.g., a compute unit or a PCU). A CGR unit includes hard-wired functionality that performs a limited number of functions used in computation graphs and dataflow graphs. Further examples of CGR units include a CU and an AG, which may be combined in an AGCU. Some implementations include CGR switches, whereas other implementations may include regular switches.

CU—coalescing unit.

Data Flow Graph—a computation graph that includes one or more loops that may be nested, and wherein nodes can send messages to nodes in earlier layers to control the dataflow between the layers.

Datapath—a collection of functional units that perform data processing operations. The functional units may include memory, multiplexers, ALUs, SIMDs, multipliers, registers, buses, etc.

FCMU—fused compute and memory unit—a circuit that includes both a memory unit and a compute unit.

Graph—a collection of nodes connected by edges. Nodes may represent various kinds of items or operations, dependent on the type of graph. Edges may represent relationships, directions, dependencies, etc.

IC—integrated circuit—a monolithically integrated circuit, i.e., a single semiconductor die which may be delivered as a bare die or as a packaged circuit. For the purposes of this document, the term integrated circuit also includes packaged circuits that include multiple semiconductor dies, stacked dies, or multiple-die substrates. Such constructions are now common in the industry, produced by the same supply chains, and for the average user often indistinguishable from monolithic circuits.

Logical CGR array or logical CGR unit—a CGR array or a CGR unit that is physically realizable, but that may not have been assigned to a physical CGR array or to a physical CGR unit on an IC.

ML—machine learning.

PCU—pattern compute unit—a compute unit that can be configured to repetitively perform a sequence of operations.

PEF—processor-executable format—a file format suitable for configuring a configurable data processor.

Pipeline—a staggered flow of operations through a chain of pipeline stages. The operations may be executed in parallel and in a time-sliced fashion. Pipelining increases overall instruction throughput. CGR processors may include pipelines at different levels. For example, a compute unit may include a pipeline at the gate level to enable correct timing of gate-level operations in a synchronous logic implementation of the compute unit, and a meta-pipeline at the graph execution level to enable correct timing of node-level operations of the configured graph. Gate-level pipelines are usually hard wired and unchangeable, whereas meta-pipelines are configured at the CGR processor, CGR array level, and/or GCR unit level.

Pipeline Stages—a pipeline is divided into stages that are coupled with one another to form a pipe topology.

PMU—pattern memory unit—a memory unit that can store data according to a programmed pattern.

PNR—place and route—the assignment of logical CGR units and associated processing/operations to physical CGR units in an array, and the configuration of communication paths between the physical CGR units.

RAIL—reconfigurable dataflow unit (RDU) abstract intermediate language.

CGR Array—an array of CGR units, coupled with each other through an array-level network (ALN), and coupled with external elements via a top-level network (TLN). A CGR array can physically implement the nodes and edges of a dataflow graph.

SIMD—single-instruction multiple-data—an arithmetic logic unit (ALU) that simultaneously performs a single programmable operation on multiple data elements delivering multiple output results.

TLIR—template library intermediate representation.

TLN—top-level network.

Implementations

The architecture, configurability and dataflow capabilities of an array of CGR units enable increased compute power that supports both parallel and pipelined computation. A CGR processor, which includes one or more CGR arrays (arrays of CGR units), can be programmed to simultaneously execute multiple independent and interdependent dataflow graphs. To enable simultaneous execution, the dataflow graphs may need to be distilled from a high-level program and translated to a configuration file for the CGR processor. A high-level program is source code written in programming languages like Spatial, Python, C++, and C, and may use computation libraries for scientific computing, ML, AI, and the like. The high-level program and referenced libraries can implement computing structures and algorithms of machine learning models like AlexNet, VGG Net, GoogleNet, ResNet, ResNeXt, RCNN, YOLO, SqueezeNet, SegNet, GAN, BERT, ELMo, USE, Transformer, and Transformer-XL.

Translation of high-level programs to executable bit files is performed by a compiler. See, for example, FIGS. 6 and 7A-7E. While traditional compilers sequentially map operations to processor instructions, typically without regard to pipeline utilization and duration (a task usually handled by the hardware), an array of CGR units requires mapping operations to processor instructions in both space (for parallelism) and time (for synchronization of interdependent computation graphs or dataflow graphs). This requirement implies that a compiler for a CGRA must decide which operation of a computation graph or dataflow graph is assigned to which of the CGR units, and how both data and, related to the support of dataflow graphs, control information flows among CGR units, and to and from external hosts and storage. This process, known as "place and route", is one of many new challenges posed to compilers for arrays of CGR units.

FIG. 1 illustrates an example coarse-grained reconfigurable architecture (CGRA) system 100 including a coarse-grained reconfigurable (CGR) processor 110 a compiler 160, runtime processes 170, a host 180, and a memory 190. CGR processor 110 includes a CGR array such as a CGR array 120. CGR array 120 includes an array of configurable units in an array level network. CGR processor 110 further includes an IO interface 138, and a memory interface 139. CGR array 120 is coupled with IO interface 138 and memory interface 139 through a data bus 130 which may be part of a top-level network (TLN). Host 180 communicates with IO interface 138 using a system data bus 185, and memory interface 139 communicates with memory 190 using a memory bus 195. A configurable unit in the CGR array 120 may comprise a compute unit or a memory unit. A configurable unit in the CGR array 120 may also comprise a pattern memory unit (PMU), a pattern compute unit (PCU), or a fused-compute memory unit (FCMU). Further examples include a coalescing unit (CU) and an address generator (AG), which may be combined in an AGCU. A configurable unit may also be reconfigurable.

The configurable units in the CGR array 120 may be connected with an array-level network (ALN) to provide the circuitry for execution of a computation graph or a dataflow graph that may have been derived from a high-level program with user algorithms and functions. The high-level program may include a set of procedures, such as learning or inferencing in an artificial intelligence (AI) or machine learning (ML) system. More specifically, the high-level program may include applications, graphs, application graphs, user applications, computation graphs, control flow graphs, dataflow graphs, models, deep learning applications, deep learning neural networks, programs, program images, jobs, tasks and/or any other procedures and functions that may need serial and/or parallel processing. In some implementations, execution of the graph(s) may involve using multiple CGR processors 110. In some implementations, CGR processor 110 may include one or more ICs. In other implementations, a single IC may span multiple CGR processors 110. In further implementations, CGR processor 110 may include multiple arrays of configurable units 120.

Host 180 may be, or include, a computer such as further described with reference to FIG. 2. Host 180 runs runtime processes 170, as further referenced herein, and may also be used to run computer programs, such as compiler 160 further described herein with reference to FIG. 9. In some implementations, compiler 160 may run on a computer that is similar to the computer described with reference to FIG. 2 but separate from host 180.

CGR processor 110 may accomplish computational tasks by executing a configuration file 165. Configuration file 165 may comprise a processor-executable format file suitable for configuring a CGR array 120 of a CGR processor 110. For the purposes of this description, a configuration file corresponds to a dataflow graph, or a translation of a dataflow graph, and may further include initialization data. Compiler 160 compiles the high-level program to provide the configuration file 165. In some implementations described herein, a CGR array 120 is configured by programming one or more configuration stores with all or parts of the configuration file 165. A single configuration store may be at the level of the CGR processor 110 or the CGR array 120, or a configurable unit may include an individual configuration store. The configuration file 165 may include configuration data for the CGR array 120 and the configurable units in the CGR array 120, and link the computation graph to the CGR array 120. Execution of the configuration file 165 by CGR processor 110 causes the array(s) of configurable units 120 (s) to implement the user algorithms and functions in the dataflow graph.

CGR processor 110 can be implemented on a single integrated circuit die or on a multichip module (MCM). An IC can be packaged in a single chip module or a multichip module. An MCM is an electronic package that may comprise multiple IC dies and other devices, assembled into a single module as if it were a single device. The various dies of an MCM may be mounted on a substrate, and the bare dies of the substrate are electrically coupled to the surface or to each other using for some examples, wire bonding, tape bonding or flip-chip bonding.

Figure 2:
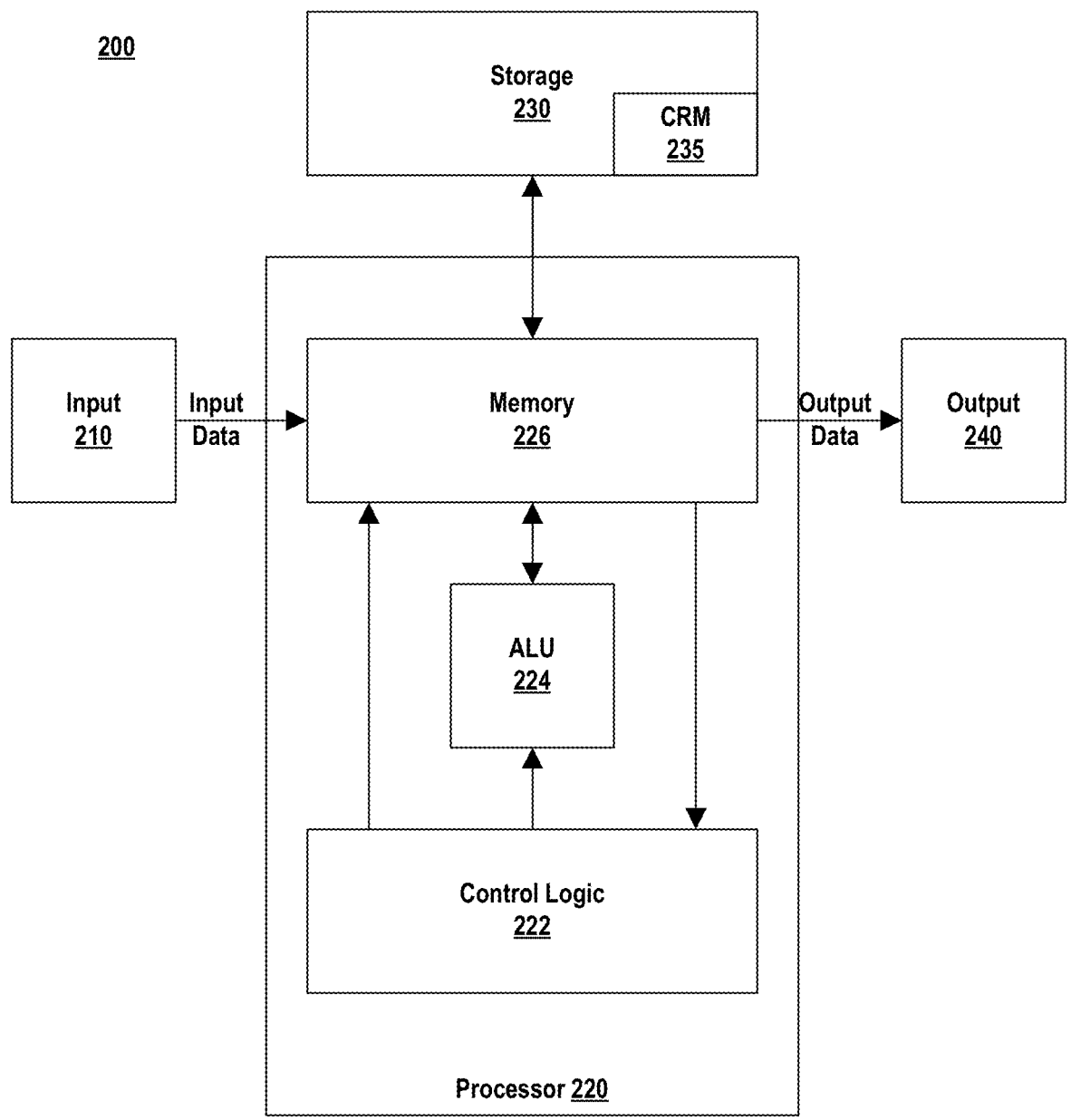
FIG. 2 illustrates an example of a computer, including an input device, a processor, a storage device, and an output device.

FIG. 2 illustrates an example of a computer 200, including an input device 210, a processor 220, a storage device 230, and an output device 240. Although the example computer 200 is drawn with a single processor, other implementations may have multiple processors. Input device 210 may comprise a mouse, a keyboard, a sensor, an input port (for example, a universal serial bus (USB) port), and any other input device known in the art. Output device 240 may comprise a monitor, printer, and any other output device known in the art. Furthermore, part or all of input device 210 and output device 240 may be combined in a network interface, such as a Peripheral Component Interconnect Express (PCIe) interface suitable for communicating with CGR processor 110. Input device 210 is coupled with processor 220 to provide input data, which an implementation may store in memory 226. Processor 220 is coupled with output device 240 to provide output data from memory 226 to output device 240. Processor 220 further includes control logic 222, operable to control memory 226 and arithmetic and logic unit (ALU) 224, and to receive program and configuration data from memory 226. Control logic 222 further controls exchange of data between memory 226 and storage device 230. Memory 226 typically comprises memory with fast access, such as static random-access memory (SRAM), whereas storage device 230 typically comprises memory with slow access, such as dynamic random-access memory (DRAM), flash memory, magnetic disks, optical disks, and any other memory type known in the art. At least a part of the memory in storage device 230 includes a non-transitory computer-readable medium (CRM 235), such as used for storing computer programs.

Figure 3:
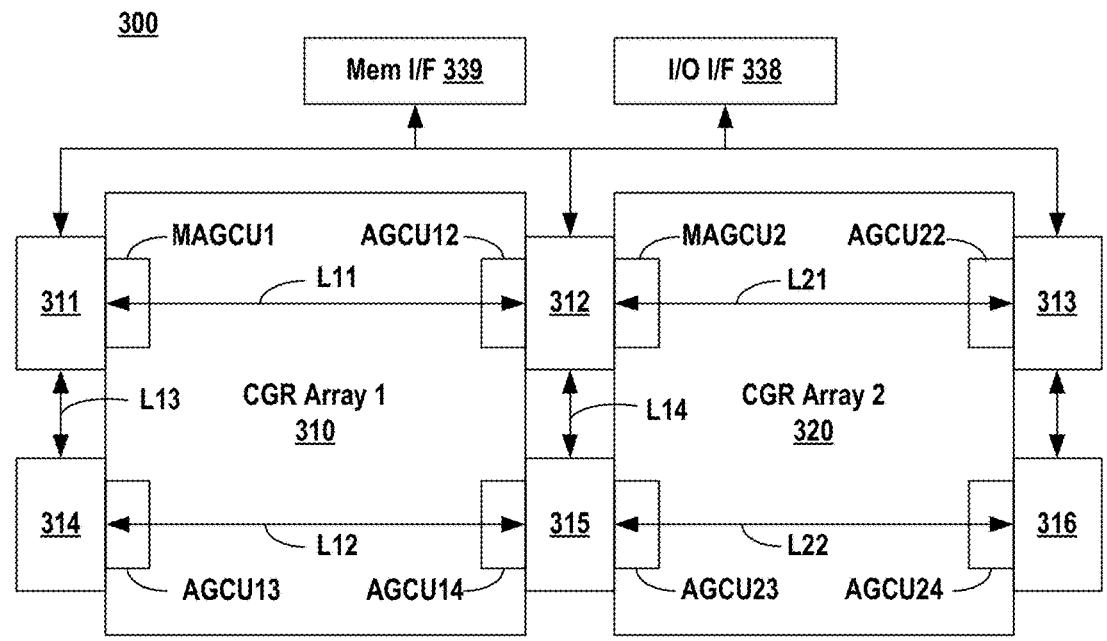
FIG. 3 illustrates example details of a CGR architecture including a top-level network (TLN) and two CGR arrays.

FIG. 3 illustrates example details of a CGR architecture 300 including a top-level network (TLN 330) and two CGR arrays (CGR array 310 and CGR array 320). A CGR array comprises an array of CGR units (e.g., PMUs, PCUs, FCMUs) coupled via an array-level network (ALN), e.g., a bus system. The ALN is coupled with the TLN 330 through several AGCUs, and consequently with I/O interface 338 (or any number of interfaces) and memory interface 339. Other implementations may use different bus or communication architectures.

Circuits on the TLN in this example include one or more external I/O interfaces, including I/O interface 338 and memory interface 339. The interfaces to external devices include circuits for routing data among circuits coupled with the TLN and external devices, such as high-capacity memory, host processors, other CGR processors, FPGA devices, and so on, that are coupled with the interfaces.

Each depicted CGR array has four AGCUs (e.g., MAGCU1, AGCU12, AGCU13, and AGCU14 in CGR array 310). The AGCUs interface the TLN to the ALNs and route data from the TLN to the ALN or vice versa.

One of the AGCUs in each CGR array in this example is configured to be a master AGCU (MAGCU), which includes an array configuration load/unload controller for the CGR array. The MAGCU1 includes a configuration load/unload controller for CGR array 310, and MAGCU2 includes a configuration load/unload controller for CGR array 320. Some implementations may include more than one array configuration load/unload controller. In other implementations, an array configuration load/unload controller may be implemented by logic distributed among more than one AGCU. In yet other implementations, a configuration load/unload controller can be designed for loading and unloading configuration of more than one CGR array. In further implementations, more than one configuration controller can be designed for configuration of a single CGR array. Also, the configuration load/unload controller can be implemented in other portions of the system, including as a stand-alone circuit on the TLN and the ALN or ALNs.

The TLN is constructed using top-level switches (switch 311, switch 312, switch 313, switch 314, switch 315, and switch 316) coupled with each other as well as with other circuits on the TLN, including the AGCUs, and external I/O interface 338. The TLN includes links (e.g., L11, L12, L21, L22) coupling the top-level switches. Data may travel in packets between the top-level switches on the links, and from the switches to the circuits on the network coupled with the switches. For example, switch 311 and switch 312 are coupled by link L11, switch 314 and switch 315 are coupled by link L12, switch 311 and switch 314 are coupled by link L13, and switch 312 and switch 313 are coupled by link L21. The links can include one or more buses and supporting control lines, including for example a chunk-wide bus (vector bus). For example, the top-level network can include data, request and response channels operable in coordination for transfer of data in any manner known in the art.

Figure 4:
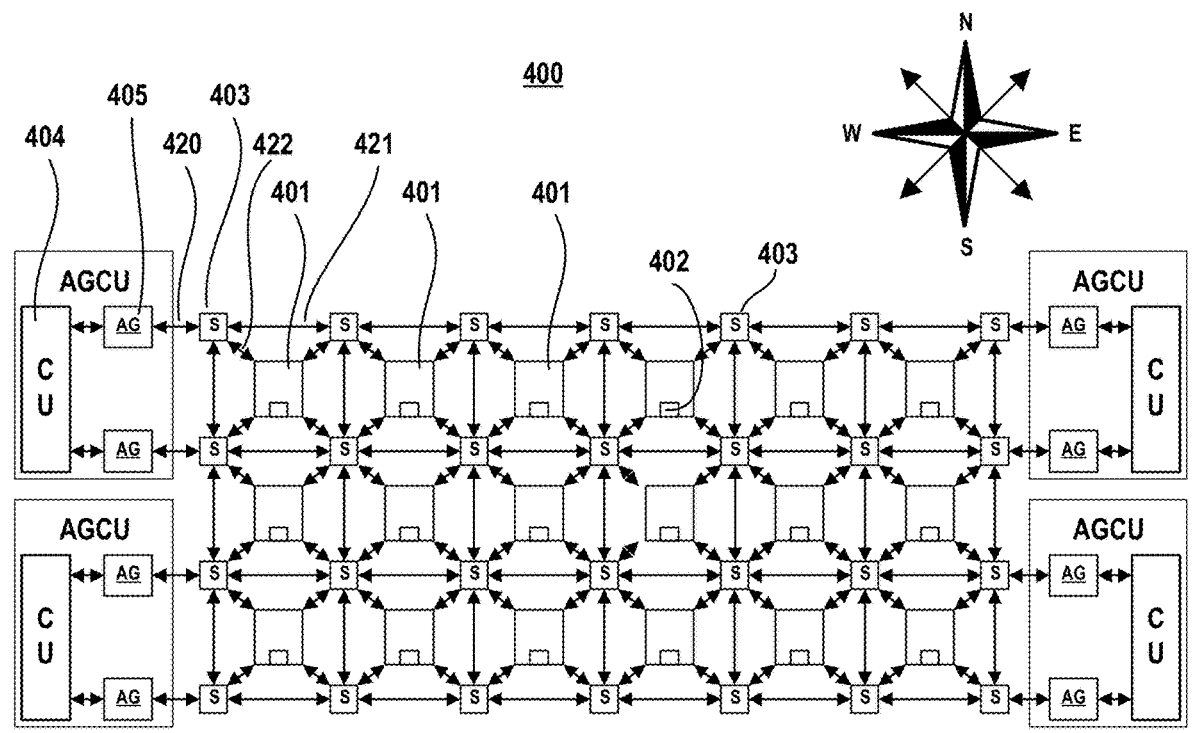
FIG. 4 illustrates an example CGR array, including an array of configurable nodes in an array-level network (ALN).

FIG. 4 illustrates an example CGR array 400, including an array of CGR units in an ALN. CGR array 400 may include several types of CGR unit 401, such as FCMUs, PMUs, PCUs, memory units, and/or compute units. For examples of the functions of these types of CGR units, see Prabhakar et al., "Plasticine: A Reconfigurable Architecture for Parallel Patterns", ISCA 2017, Jun. 24-28, 2017, Toronto, ON, Canada. Each of the CGR units may include a configuration store 402 comprising a set of registers or flip-flops storing configuration data that represents the setup and/or the sequence to run a program, and that can include the number of nested loops, the limits of each loop iterator, the instructions to be executed for each stage, the source of operands, and the network parameters for the input and output interfaces. In some implementations, each CGR unit 401 comprises an FCMU. In other implementations, the array comprises both PMUs and PCUs, or memory units and compute units, arranged in a checkerboard pattern. In yet other implementations, CGR units may be arranged in different patterns. The ALN includes switch units 403 (S), and AGCUs (each including two address generators 405 (AG) and a shared coalescing unit 404 (CU)). Switch units 403 are connected among themselves via interconnects 421 and to a CGR unit 401 with interconnects 422. Switch units 403 may be coupled with address generators 405 via interconnects 420. In some implementations, communication channels can be configured as end-to-end connections, and switch units 403 are CGR units. In other implementations, switches route data via the available links based on address information in packet headers, and communication channels establish as and when needed.

A configuration file may include configuration data representing an initial configuration, or starting state, of each of the CGR units that execute a high-level program with user algorithms and functions. Program load is the process of setting up the configuration stores in the CGR array based on the configuration data to allow the CGR units to execute the high-level program. Program load may also require loading memory units and/or PMUs.

The ALN includes one or more kinds of physical data buses, for example a chunk-level vector bus (e.g., 512 bits of data), a word-level scalar bus (e.g., 32 bits of data), and a control bus. For instance, interconnects 421 between two switches may include a vector bus interconnect with a bus width of 512 bits, and a scalar bus interconnect with a bus width of 32 bits. A control bus can comprise a configurable interconnect that carries multiple control bits on signal routes designated by configuration bits in the CGR array's configuration file. The control bus can comprise physical lines separate from the data buses in some implementations. In other implementations, the control bus can be implemented using the same physical lines with a separate protocol or in a time-sharing procedure.

Physical data buses may differ in the granularity of data being transferred. In one implementation, a vector bus can carry a chunk that includes 16 channels of 32-bit floating-point data or 32 channels of 16-bit floating-point data (i.e., 512 bits) of data as its payload. A scalar bus can have a 32-bit payload and carry scalar operands or control information. The control bus can carry control handshakes such as tokens and other signals. The vector and scalar buses can be packet-switched, including headers that indicate a destination of each packet and other information such as sequence numbers that can be used to reassemble a file when the packets are received out of order. Each packet header can contain a destination identifier that identifies the geographical coordinates of the destination switch unit (e.g., the row and column in the array), and an interface identifier that identifies the interface on the destination switch (e.g., North, South, East, West, etc.) used to reach the destination unit.

A CGR unit 401 may have four ports (as drawn) to interface with switch units 403, or any other number of ports suitable for an ALN. Each port may be suitable for receiving and transmitting data, or a port may be suitable for only receiving or only transmitting data.

A switch unit, as shown in the example of FIG. 4, may have eight interfaces. The North, South, East and West interfaces of a switch unit may be used for links between switch units using interconnects 421. The Northeast, Southeast, Northwest and Southwest interfaces of a switch unit may each be used to make a link with an FCMU, PCU or PMU instance using one of the interconnects 422. Two switch units in each CGR array quadrant have links to an AGCU using interconnects 420. The AGCU coalescing unit arbitrates between the AGs and processes memory requests. Each of the eight interfaces of a switch unit can include a vector interface, a scalar interface, and a control interface to communicate with the vector network, the scalar network, and the control network. In other implementations, a switch unit may have any number of interfaces.

During execution of a graph or subgraph in a CGR array after configuration, data can be sent via one or more switch units and one or more links between the switch units to the CGR units using the vector bus and vector interface(s) of the one or more switch units on the ALN. A CGR array may comprise at least a part of CGR array 400, and any number of other CGR arrays coupled with CGR array 400.

A data processing operation implemented by CGR array configuration may comprise multiple graphs or subgraphs specifying data processing operations that are distributed among and executed by corresponding CGR units (e.g., FCMUs, PMUs, PCUs, AGs, and CUs).

Figure 5:
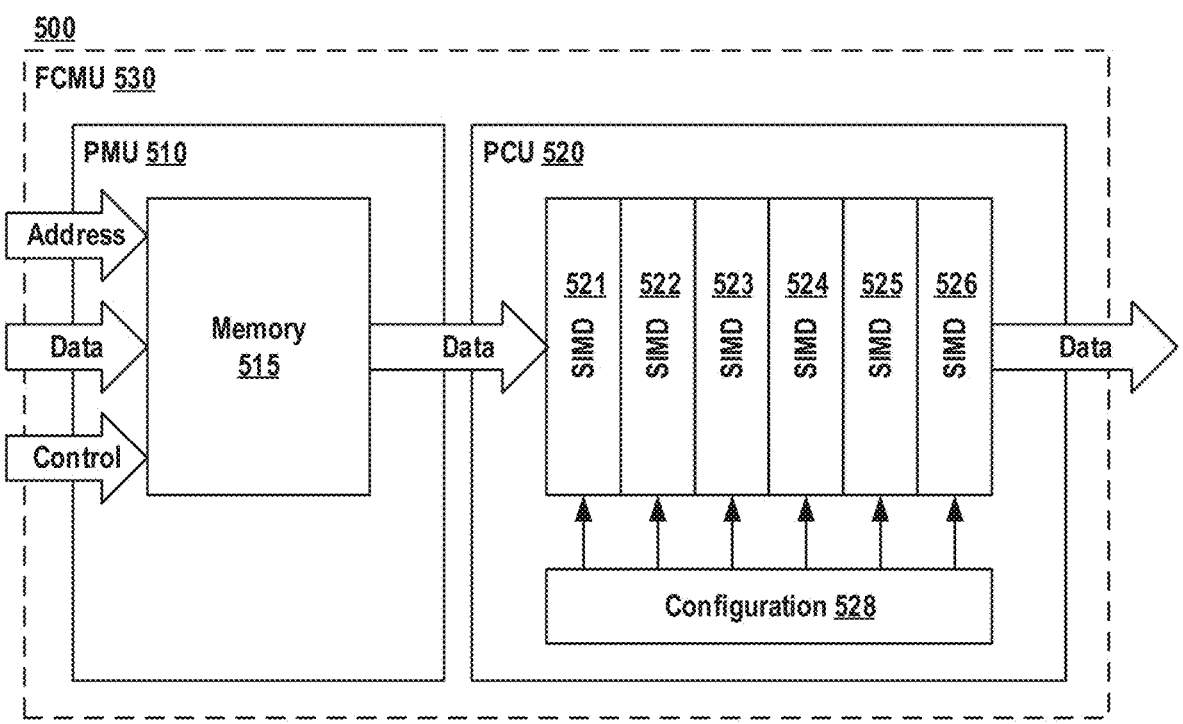
FIG. 5 illustrates an example of a pattern memory unit (PMU) and a pattern compute unit (PCU), which may be combined in a fused-control memory unit (FCMU).

FIG. 5 illustrates an example 500 of a PMU 510 and a PCU 520, which may be combined in an FCMU 530. PMU 510 may be directly coupled to PCU 520, or optionally via one or more switches. PMU 510 includes a scratchpad memory 515, which may receive external data, memory addresses, and memory control information (write enable, read enable) via one or more buses included in the ALN. PCU 520 includes two or more processor stages, such as SIMD 521 through SIMD 526, and configuration store 528. The processor stages may include ALUs, or SIMDs, as drawn, or any other reconfigurable stages that can process data.

Each stage in PCU 520 may also hold one or more registers (not drawn) for short-term storage of parameters. Short-term storage, for example during one to several clock cycles or unit delays, allows for synchronization of data in the PCU pipeline.

Figure 6:
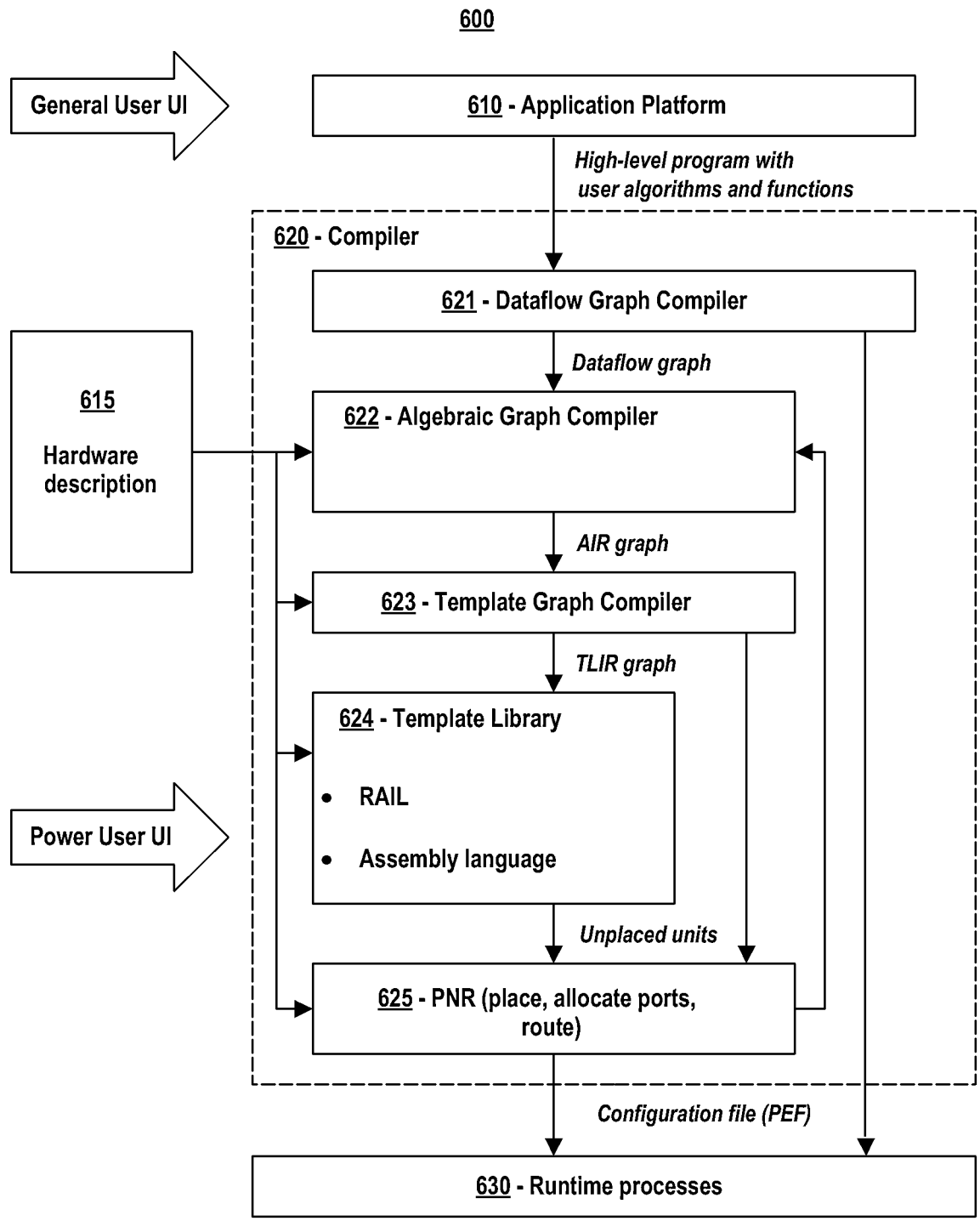
FIG. 6 is a block diagram of a compiler stack implementation suitable for generating a configuration file for a CGR processor.

Referring now to FIG. 6 which is a block diagram of a compiler stack 600 implementation suitable for generating a configuration file for a CGR processor. Referring also to FIGS. 7A-7E which illustrate various representations of an example user program 710 corresponding to various stages of a compiler stack such as the compiler stack 600. As depicted, compiler stack 600 includes several stages to convert a high-level program (e.g., user program 710) with statements 712 that define user algorithms and functions, e.g., algebraic expressions and functions, to configuration data for the CGR units.

Compiler stack 600 may take its input from application platform 610, or any other source of high-level program statements suitable for parallel processing, which provides a user interface for general users. It may further receive hardware description 615, for example defining the physical units in a reconfigurable data processor or CGRA processor. Application platform 610 may include libraries such as PyTorch, TensorFlow, ONNX, Caffe, and Keras to provide user-selected and configured algorithms. The example user program 710 depicted in FIG. 7A comprises statements 712 that invoke various PyTorch functions.

Application platform 610 outputs a high-level program to compiler 620, which in turn outputs a configuration file to the reconfigurable data processor or CGRA processor where it is executed in runtime processes 630. Compiler 620 may include dataflow graph compiler 621, which may handle a dataflow graph, algebraic graph compiler 622, template graph compiler 623, template library 624, and placer and router (PNR) 625. In some implementations, template library 624 includes RDU abstract intermediate language (RAIL) and/or assembly language interfaces for power users.

Dataflow graph compiler 621 converts the high-level program with user algorithms and functions from application platform 610 to one or more dataflow graphs. The high-level program may be suitable for parallel processing, and therefore parts of the nodes of the dataflow graphs may be intrinsically parallel unless an edge in the graph indicates a dependency. Dataflow graph compiler 621 may provide code optimization steps like false data dependency elimination, dead-code elimination, and constant folding. The dataflow graphs encode the data and control dependencies of the high-level program.

Dataflow graph compiler 621 may support programming a reconfigurable data processor at higher or lower-level programming languages, for example from an application platform 610 to C++ and assembly language. In some implementations, dataflow graph compiler 621 allows programmers to provide code that runs directly on the reconfigurable data processor. In other implementations, dataflow graph compiler 621 provides one or more libraries that include predefined functions like linear algebra operations, element-wise tensor operations, non-linearities, and reductions required for creating, executing, and profiling the dataflow graphs on the reconfigurable processors. Dataflow graph compiler 621 may provide an application programming interface (API) to enhance functionality available via the application platform 610.

Algebraic graph compiler 622 may include a model analyzer and compiler (MAC) level that makes high-level mapping decisions for (sub-graphs of the) dataflow graph based on hardware constraints. It may support various application frontends such as Samba, JAX, and TensorFlow/HLO. Algebraic graph compiler 622 may also transform the graphs via autodiff and GradNorm, perform stitching between sub-graphs, interface with template generators for performance and latency estimation, convert dataflow graph operations to AIR operation, perform tiling, sharding (database partitioning) and other operations, and model or estimate the parallelism that can be achieved on the dataflow graphs.

Algebraic graph compiler 622 may further include an arithmetic or algebraic intermediate representation (AIR) stage that translates high-level graph and mapping decisions provided by the MAC level into explicit AIR/Tensor statements 720 and one or more corresponding algebraic graphs 725 as shown in FIG. 7B. In the depicted example, the algebraic graph compiler replaces the Softmax function specified in the user program 710 by its constituent statements/nodes (i.e., exp, sum and div). Key responsibilities of the AIR level include legalizing the graph and mapping decisions of the MAC, expanding data parallel, tiling, metapipe, region instructions provided by the MAC, inserting stage buffers and skip buffers, eliminating redundant operations, buffers and sections, and optimizing for resource use, latency, and throughput.

Template graph compiler 623 may translate AIR statements and/or graphs into TLIR statements 730 and/or graph(s) 735 (see FIG. 7C), optimizing for the target hardware architecture, into unplaced variable-sized units (referred to as logical CGR units) suitable for PNR 625. Meta-pipelines 732 that enable iteration control may be allocated for sections of the TLIR statements and/or corresponding sections of the graph(s) 735. Template graph compiler 623 may add further information (name, inputs, input names and dataflow description) for PNR 625 and make the graph physically realizable through each performed step. Template graph compiler 623 may for example provide translation of AIR graphs to specific model operation templates such as for general matrix multiplication (GeMM). An implementation may convert part or all intermediate representation operations to templates, stitch templates into the dataflow and control flow, insert necessary buffers and layout transforms, generate test data and optimize for hardware use, latency, and throughput.

Implementations may use templates for common operations. Templates may be implemented using assembly language, RAIL, or similar. RAIL is comparable to assembly language in that memory units and compute units are separately programmed, but it can provide a higher level of abstraction and compiler intelligence via a concise performance-oriented domain-specific language for CGR array templates. RAIL enables template writers and external power users to control interactions between logical compute units and memory units with high-level expressions without the need to manually program capacity splitting, register allocation, etc. The logical compute units and memory units also enable stage/register allocation, context splitting, transpose slotting, resource virtualization and mapping to multiple physical compute units and memory units (e.g., PCUs and PMUs).

Template library 624 may include an assembler that provides an architecture-independent low-level programming interface as well as optimization and code generation for the target hardware. Responsibilities of the assembler may include address expression compilation, intra-unit resource allocation and management, making a template graph physically realizable with target-specific rules, low-level architecture-specific transformations and optimizations, and architecture-specific code generation.

Figure 7D:
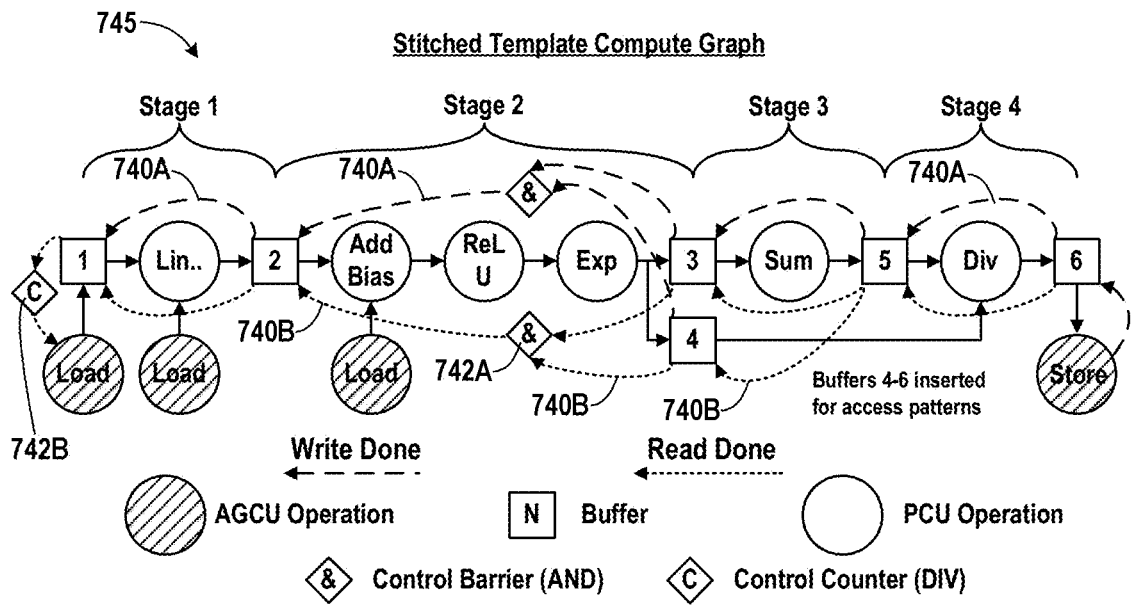
Figure 7E:
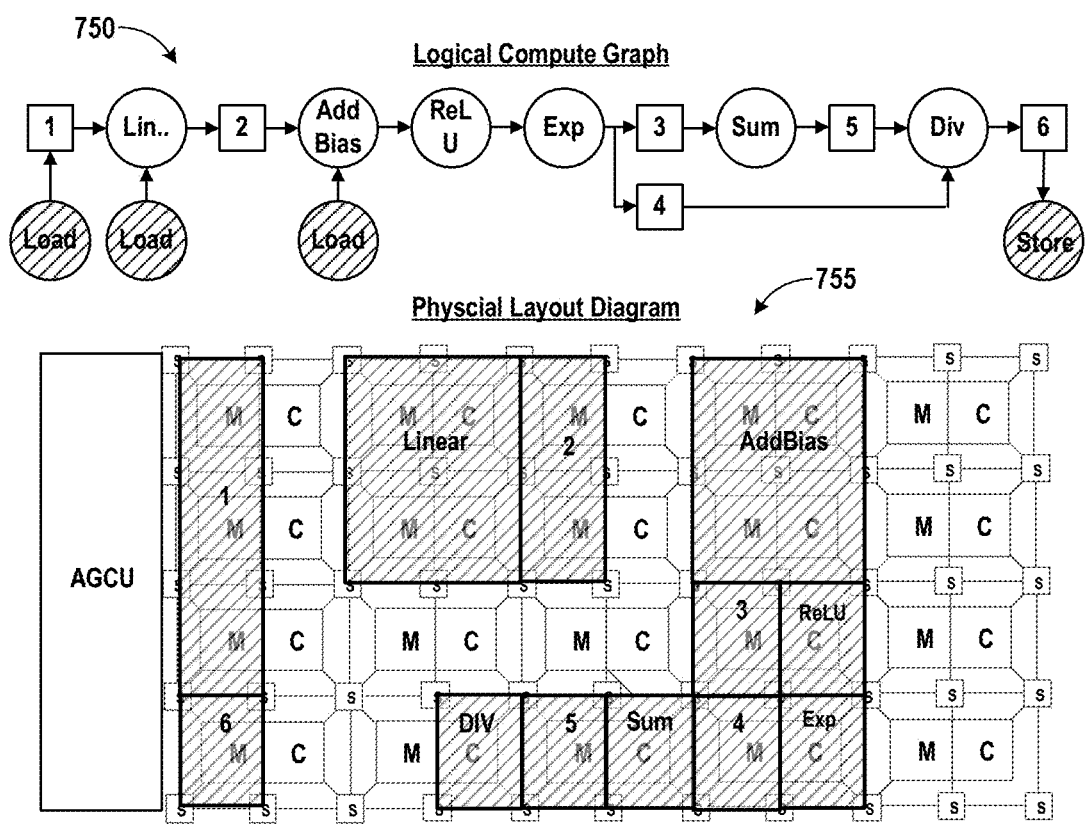

Referring to FIG. 7D, the template graph compiler may also determine the control signals 740 and control gates 742 required to enable the CGR units (whether logical or physical) to coordinate dataflow between the CGR units on the communication fabric of a CGR processor. This process, sometimes referred to as stitching, produces a stitched template compute graph 745 with control signals 740 and control gates 742. In the example depicted in FIG. 7D, the control signals 740 include write done signals 740A and read done signals 740B and the control gates 742 include 'AND' gates 742A and a counting or 'DIV' gate 742B. The control signals 740 and control gates 742 enable coordinated dataflow between the configurable units of CGR processors such as compute units, memory units, and AGCUs.

PNR 625 translates and maps logical (i.e., unplaced physically realizable) CGR units (e.g., the nodes of the logical compute graph 750 shown in FIG. 7E) to a physical layout (e.g., the physical layout 755 shown in FIG. 7E) on the physical chip level e.g., a physical array of CGR units. PNR 625 also determines physical data channels to enable communication among the CGR units and between the CGR units and circuits coupled via the TLN, allocates ports on the CGR units and switches, provides configuration data and initialization data for the target hardware, and produces configuration files, e.g., processor-executable format (PEF) files. It may further provide bandwidth calculations, allocate network interfaces such as AGCUs and virtual address generators (VAGs), provide configuration data that allows AGCUs and/or VAGs to perform address translation, and control ALN switches and data routing. PNR 625 may provide its functionality in multiple steps and may include multiple modules (not shown in FIG. 6) to provide the multiple steps, e.g., a placer, a router, a port allocator, and a PEF file generator. PNR 625 may receive its input data in various ways. For example, it may receive parts of its input data from any of the earlier modules (dataflow graph compiler 621, algebraic graph compiler 622, template graph compiler 623, and/or template library 624). In some implementations, an earlier module, such as template graph compiler 623, may have the task of preparing all information for PNR 625 and no other units provide PNR input data directly.

Further implementations of compiler 620 provide for an iterative process, for example by feeding information from PNR 625 back to an earlier module, so that the earlier module can execute a new compilation step in which it uses physically realized results rather than estimates of or placeholders for physically realizable circuits. For example, PNR 625 may feed information regarding the physically realized circuits back to algebraic graph compiler 622.

Memory allocations represent the creation of logical memory spaces in on-chip and/or off-chip memories for data required to implement the dataflow graph, and these memory allocations are specified in the configuration file. Memory allocations define the type and the number of hardware circuits (functional units, storage, or connectivity components). Main memory (e.g., DRAM) may be off-chip memory, and scratchpad memory (e.g., SRAM) is on-chip memory inside a CGR array. Other memory types for which the memory allocations can be made for various access patterns and layouts include cache, read-only look-up tables (LUTs), serial memories (e.g., FIFOs), and register files.

Compiler 620 binds memory allocations to unplaced memory units and binds operations specified by operation nodes in the dataflow graph to unplaced compute units, and these bindings may be specified in the configuration data. In some implementations, compiler 620 partitions parts of a dataflow graph into memory subgraphs and compute subgraphs, and specifies these subgraphs in the PEF file. A memory subgraph may comprise address calculations leading up to a memory access. A compute subgraph may comprise all other operations in the parent graph. In one implementation, a parent graph is broken up into multiple memory subgraphs and exactly one compute subgraph. A single parent graph can produce one or more memory subgraphs, depending on how many memory accesses exist in the original loop body. In cases where the same memory addressing logic is shared across multiple memory accesses, address calculation may be duplicated to create multiple memory subgraphs from the same parent graph.

Compiler 620 generates the configuration files with configuration data (e.g., a bit stream) for the placed positions and the routed data and control networks. In one implementation, this includes assigning coordinates and communication resources of the physical CGR units by placing and routing unplaced units onto the array of CGR units while maximizing bandwidth and minimizing latency.

A first example of accelerated deep learning is using a deep learning accelerator implemented in a CGRA to train a neural network. A second example of accelerated deep learning is using the deep learning accelerator to operate a trained neural network to perform inferences. A third example of accelerated deep learning is using the deep learning accelerator to train a neural network and subsequently perform inference with any one or more of the trained neural network, information from the trained neural network, and a variant of the same.

Examples of neural networks include fully connected neural networks (FCNNs), recurrent neural networks (RNNs), graph neural networks (GNNs), convolutional neural networks (CNNs), graph convolutional networks (GCNs), long short-term memory (LSTM) networks, autoencoders, deep belief networks, and generative adversarial networks (GANs).

An example of training a neural network is determining one or more weights associated with the neural network, such as by back-propagation in a deep learning accelerator. An example of making an inference is using a trained neural network to compute results by processing input data using the weights associated with the trained neural network. As used herein, the term 'weight' is an example of a 'parameter' as used in various forms of neural network processing. For example, some neural network learning is directed to determining parameters (e.g., through back-propagation) that are usable for performing neural network inferences.

A neural network processes data according to a dataflow graph comprising layers of neurons. Example layers of neurons include input layers, hidden layers, and output layers. Stimuli (e.g., input data) are received by an input layer of neurons and the computed results of the dataflow graph (e.g., output data) are provided by an output layer of neurons. Example hidden layers include rectified linear unit (ReLU) layers, fully connected layers, recurrent layers, graphical network layers, long short-term memory layers, convolutional layers, kernel layers, dropout layers, and pooling layers. A neural network may be conditionally and/or selectively trained. After being trained, a neural network may be conditionally and/or selectively used for inference.

Examples of ICs, or parts of ICs, that may be used as deep learning accelerators, are processors such as central processing unit (CPUs), CGR processor ICs, graphics processing units (GPUs), FPGAs, ASICs, application-specific instruction-set processor (ASIP), and digital signal processors (DSPs). The disclosed technology implements efficient distributed computing by allowing an array of accelerators (e.g., reconfigurable processors) attached to separate hosts to directly communicate with each other via buffers.

Figure 8:
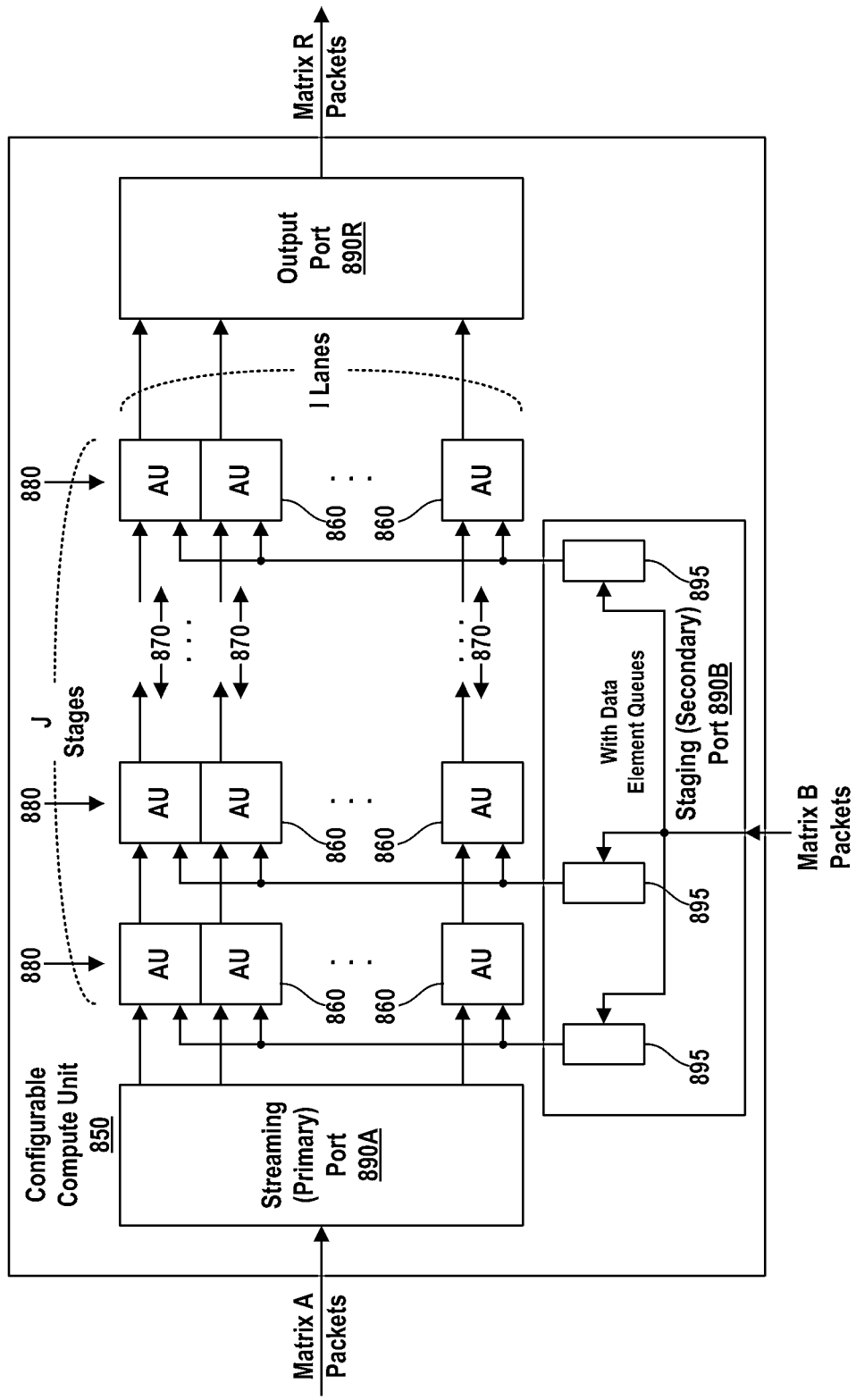
FIG. 8 is a block diagram illustrating one specific example of a configurable compute unit.

FIG. 8 is a block diagram illustrating one example of a configurable compute unit 850. As depicted, the configurable compute unit 850 includes an array of arithmetic units 860 organized into I lanes 870 and J (pipelined) stages 880. The configurable compute unit 850 also includes a set of ports 890 including a streaming (or primary) port 890A, a staging (or secondary) port 890B, and an output port 890R. The configurable compute unit 850 is one example of the PCU 520 depicted in FIG. 5. The configurable compute unit 850 may be configured to efficiently execute various mathematical and machine learning operations such as matrix multiplication, convolution, data normalization, soft-max and the like.

The streaming port 890 may be configured to sequentially stream vector packets comprising matrix or vector data through the I lanes 870 of the array of arithmetic units 860. The collection of I lanes may be referred to as a vector bus. Each of the vector packets may comprise I data elements corresponding to I rows or columns of matrix (or vector) A data. In some examples, a row connected memory unit is configured to stream I rows of matrix or vector data by providing the vector packets to the configurable compute unit 850 and other configurable compute units 850 (on the same row of a computing grid) that are assigned to a computing task or operation.

The staging port 890B may be configured to receive J vector packets corresponding to J columns or rows of (e.g., matrix B) data and sequentially provide a data element from each of the J vector packets to a corresponding stage of the array of arithmetic units 860. The J vector packets may be received by a set of J data element queues 895 that sequentially provide one data element at a time to the arithmetic units 860 of the corresponding stage 880. In the depicted example, each data element queue 895 can provide one data element to every arithmetic unit of the corresponding stage 880 in a single compute cycle.

The arithmetic units 860 may be configured to repetitively conduct multiply-accumulate or similar operations using a data element from the streaming port and a data element from the staging port. In the depicted example, multiply accumulate or similar operations may be concurrently conducted by each arithmetic unit. For example, each arithmetic unit could conduct an inner product of the rows or columns of a matrix provided to the streaming port 890A and the columns or rows of a matrix provided to the staging port 890B.

One of skill in the art will appreciate that the J stages 880 of the array of arithmetic units 860 may act as data registers for the lanes 870 while the matrix or vector data is streamed through the stages of the configurable compute unit. For example, when the multiply accumulate or similar operations are complete (e.g., when computing an inner product) the internal accumulators of the arithmetic units (not shown) may be provided to the outputs of the arithmetic units and then advanced through the remaining stages to the output port 890R and then to one or more memory units assigned to store the output results.

Figure 9:
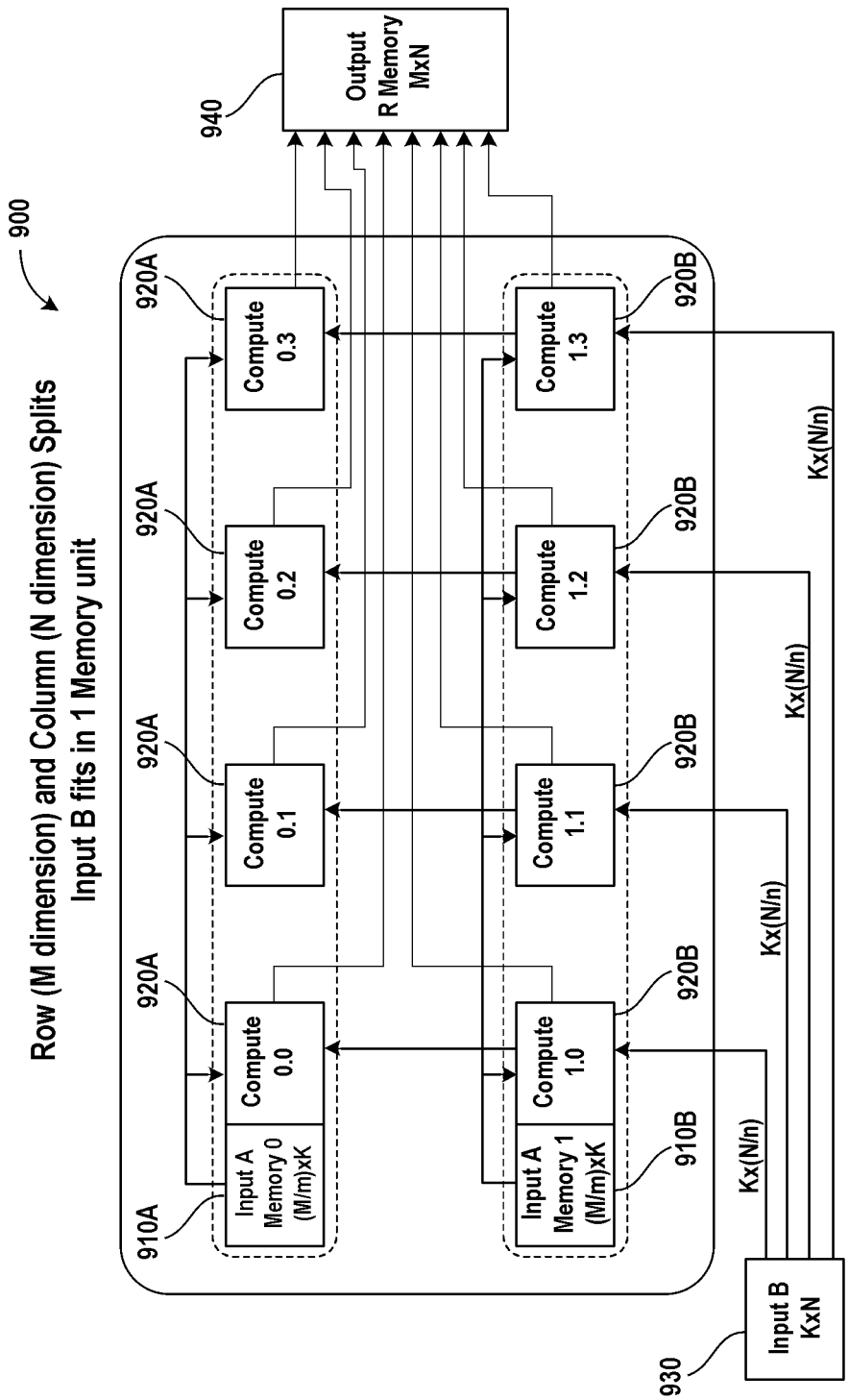
FIG. 9 shows one example of distributing matrices in an example grid computing environment.

FIG. 9 shows one example of distributing matrices in an example grid computing environment. As depicted, a first matrix (identified as matrix A) may be distributed to memory units 910 that are each (tightly) coupled to, and dedicated to, one or more compute units in a row of compute units 920. In the depicted example, data is provided by the memory units 910 to the primary port of the corresponding compute units via vector packets. While the depicted example illustrates coupling between memory units and corresponding compute units that are on the same row, the coupling could also be between memory units and corresponding compute units on the same column.

In the depicted example, memory unit 910A is coupled to (a first row of) the compute units 920A, memory unit 910B is coupled to (a second row of) the compute units 920B and half of the rows of matrix A are provided to each row of compute units 920. In contrast, matrix B data may be narrowcast, as needed, to a specific set of compute units. For example, all of the compute units in a column of a (virtual or physical) computing grid may be provided with specific columns from matrix B (e.g., that correspond to an assigned submatrix). The specific columns may be sent (i.e., narrowcast) from one or more memory units 930 to the secondary port of the compute units within a column via a set of packets that are intended only for the compute units within that column. Consequently, in the described example each of the compute units in the grid need only be provided with, and receive, those packets that contain those columns of matrix B to which they are assigned.

In the depicted example, matrix B is stored in a single memory unit 930 and matrix R is stored in a single (grid connected) memory unit 940. However, matrix B and/or matrix R, may be spread across multiple memory units 930/940. In those examples, an interposer memory unit (not shown) may be used to retrieve matrix B data and distribute the data to the appropriate compute units as needed. Similarly, an interposer memory unit (not shown) may be used to receive matrix R data from the compute units and distribute the data to the appropriate memory units that are selected to (at least temporarily) store matrix R.

One of skill in the art will appreciate that the bandwidth requirement for the primary port may be higher than the secondary port due to the rate at which vector-sized data packets are streamed to the vector bus of the compute unit. In contrast, the bandwidth requirement for secondary port (e.g., one vector element per cycle) may be much lower. Consequently, as shown in FIG. 9, matrix A data is preferably partitioned by rows into separate memory units for each row of compute units. In contrast, matrix B data may be broadcast to all compute units or narrowcast to each column of compute units by a similar partitioning of the matrix B data by columns. However, since the bandwidth requirement for matrix B data is less than matrix A, it may not be necessary to partition the matrix B data into separate memory units and thereby use fewer memory units.

Figure 10A:
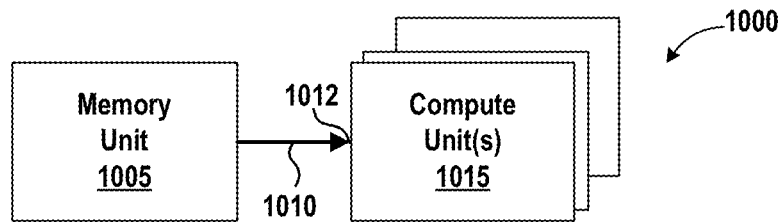
FIG. 10A is a block diagram illustrating one example of a placement and routing cluster suitable for a reconfigurable grid computing environment.

FIG. 10A is a block diagram illustrating one example of a placement and routing cluster 1000 suitable for a reconfigurable grid computing environment. As depicted, the placement and routing cluster 1000 includes a memory unit 1005 connected to one or more compute units 1015 via a primary connection 1010 to a primary port 1012 of each compute unit 1015. To facilitate efficient communication, each of the elements of the placement and routing cluster 1000 may be placed on the same row or column of a reconfigurable computing grid.

Figure 10B:
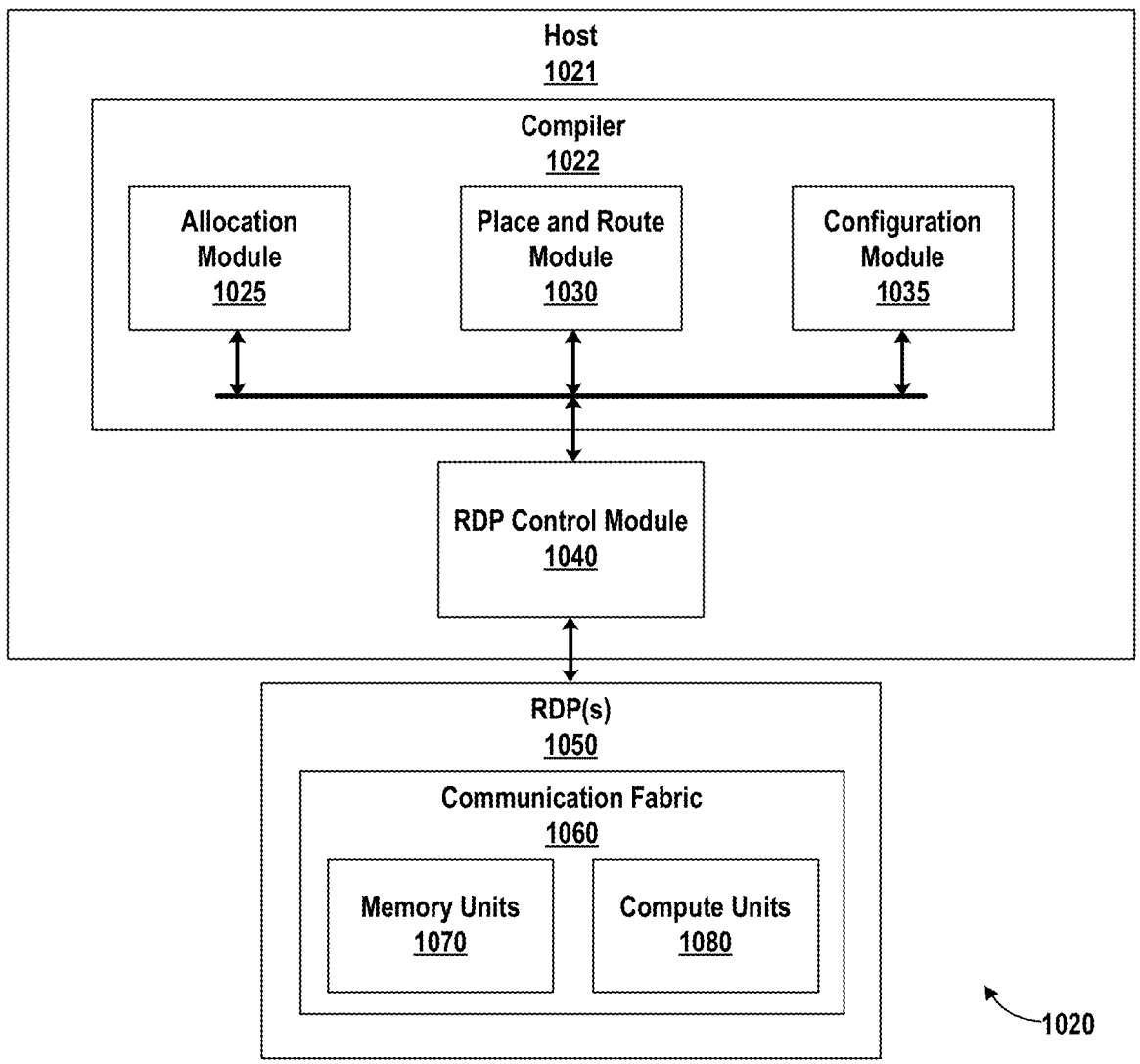
FIG. 10B is a block diagram illustrating one example of a configurable computing system that uses cluster-based placement and routing.

FIG. 10B is a block diagram illustrating one example of a configurable computing system 1020. As depicted, the configurable computing system 1020 includes an allocation module 1025, a place and route module 1030, a configuration module 1035, an RDP control module 1040, and one or more RDPs 1050 comprising a communication fabric 1060, memory units 1070 and compute units 1080. The configurable computing system 1020 enables assignment, placement, routing and configuration of configurable units within the RDPs 1050.

The allocation module 1025 may determine how many compute units will be assigned to specific mathematical operations (e.g., for a tensor), the number or memory units that will be required to support those operations and the required connections between the compute units and memory units. For example, the allocation module 1025 may determine the number of compute units required to conduct a matrix multiplication operation (e.g., R=A*B) at a desired throughput, the number of memory units needed to stream the input matrices and produce the output matrix and the number and quality of the connections between the memory units and the compute units. In some examples, the output of the assignment module 1025 is a placement graph that indicates the compute units and memory units that need to be placed and the quality of the connections between the memory units and the compute units. See FIGS. 12 and 15 for examples of a placement graph.

The place and route module 1030 may receive allocation information (e.g., via a placement graph) from the allocation module 1025 and determine the (absolute or relative) location of the compute units and memory units within a reconfigurable computing grid. The place and route module 1030 may also determine the (absolute or relative) connection paths between the memory units and the compute units within the communication fabric 1060. The placement and routing conducted by the place and route module 1030 may be cluster-based.

The configuration module 1035 may generate the compute unit, memory unit and switching fabric configuration information that enables execution of a computing task within the RDPs 1050 and storage of the output results.

The RDP control module 1040 may communicate the compute unit, memory unit and switching fabric configuration information to the RDP(s) 1050 and initiate data flow in the computing grid. The communication fabric 1060 may enable communication between the RDP control module 1040 and memory units 1070 and compute units 1080 within the RDP(s) 1050.

Figure 11:
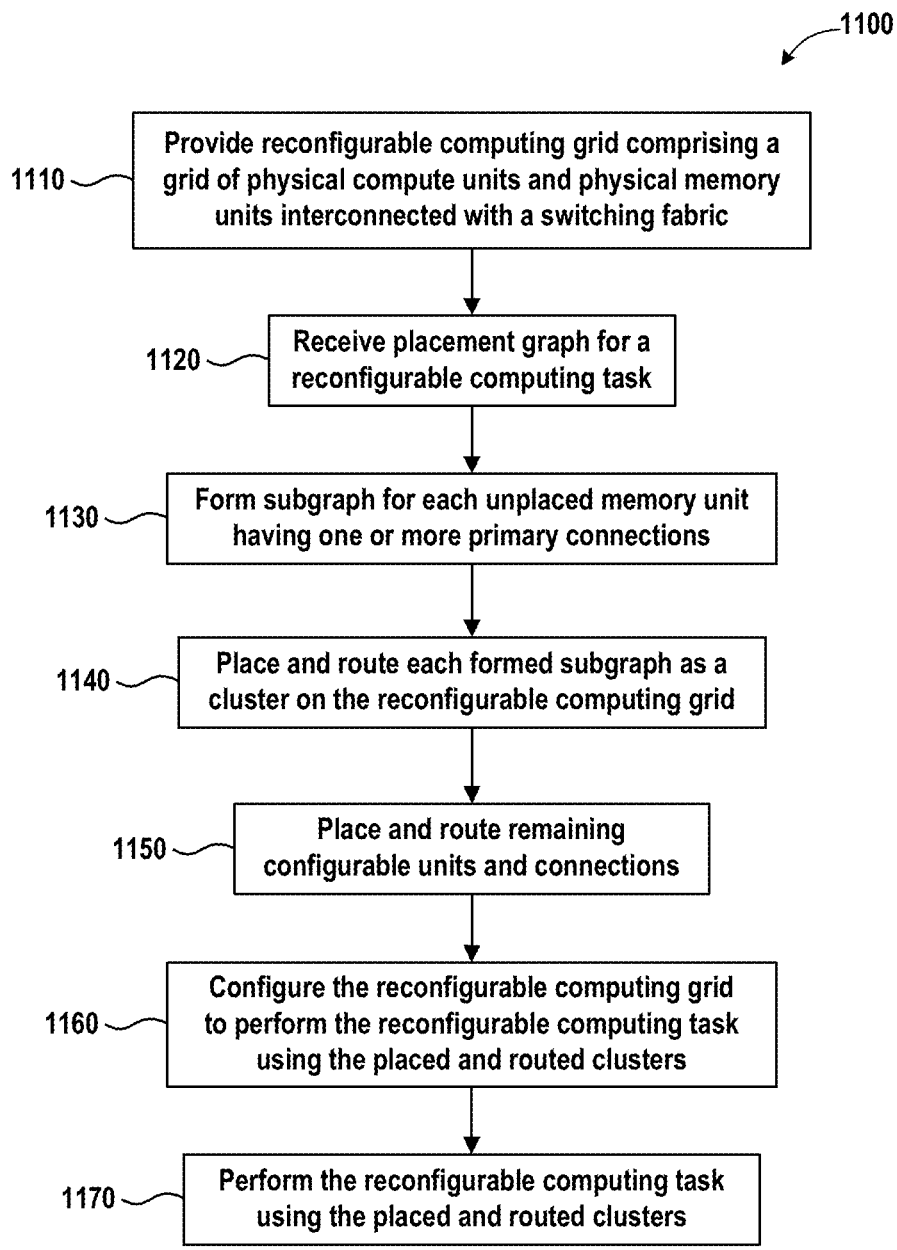
FIG. 11 is a flowchart of one example of a cluster-based placement and routing method suitable for a reconfigurable grid computing environment.

FIG. 11 is a flowchart of one example of a cluster-based placement and routing method 1100 suitable for a reconfigurable grid computing environment. As depicted, the cluster-based placement and routing method 1100 includes providing (1110) a reconfigurable computing grid, receiving (1120) a placement graph for a computing task, forming (1130) subgraphs, placing and routing (1140) each formed subgraph, placing and routing (1150) any remaining configurable units and connections, configuring (1160) the reconfigurable computing grid and performing (1170) the computing task. The cluster-based placement and routing method 1100 enables automated placement and routing and may be conducted by the configurable computing system 1020.

Providing (1110) a reconfigurable computing grid may include providing one or more RDPs 1050 that comprise a grid of compute units interleaved with a grid of memory units. Alternately, the reconfigurable computing grid may comprise fused compute and memory units. The elements of the grid of compute units and memory units may be interconnected via a communication fabric.

Receiving (1120) a placement graph for a computing task may include receiving a graph where the nodes of the graph indicate the compute units and memory units that are allocated to a computing task and the edges of graph indicate the connections between the memory units and the compute units and the quality (e.g., needed bandwidth or throughput) of those connections. In one example, high throughput connections are associated with connections to a primary port of a compute unit.

Forming (1130) subgraphs may include forming a subgraph for each memory unit having one or more primary (high throughput) connections to compute units. The compute units connected to the memory unit via a primary connection may be included in the subgraph.

Placing and routing (1140) each formed subgraph may include (absolute or relative) placement and routing of each formed subgraph as a cluster on a computing grid. For example, the memory unit of a cluster and the compute units connected to the memory unit via a primary connection may be placed adjacent to each other on the same row or column of the computing grid.

Placing and routing (1150) any remaining configurable units and connections may include placing memory units and compute units that have no primary connections and then routing all secondary connections specified in the placement graph.

Configuring (1160) the reconfigurable computing grid may include determining the configuration information for configurable elements of the reconfigurable computing grid and communicating the configuration information to one or more RDPs 1050 (e.g., via the RDP control module 1040). Performing (1170) the computing task may include initiating dataflow within the reconfigurable computing grid via the RDP control module 1040.

Figure 12:
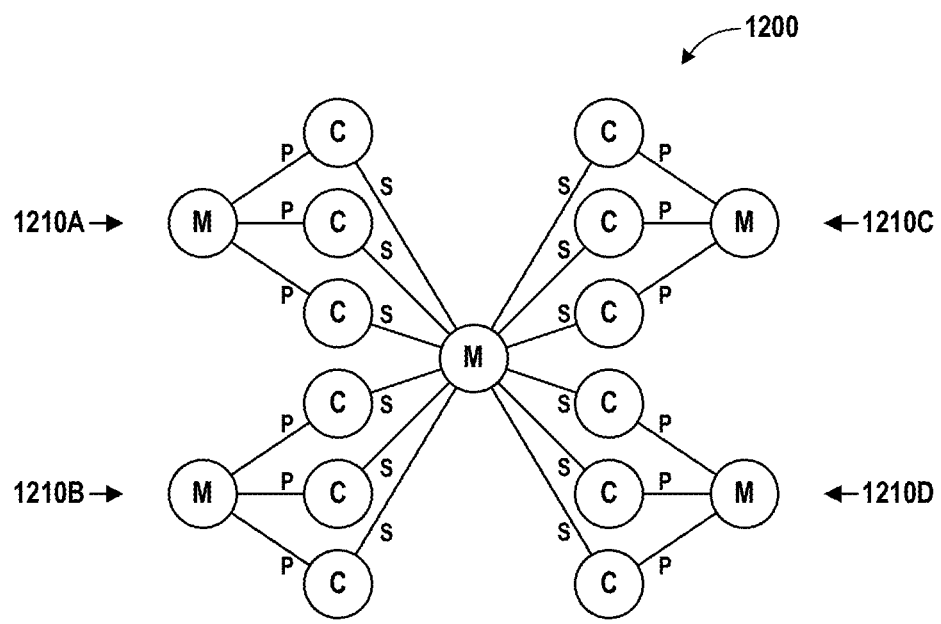
FIG. 12 is one example of a placement graph suitable for the placement and routing method depicted in FIG. 11.

FIG. 12 depicts one example of a placement graph 1200 suitable for the placement and routing method 1100 depicted in FIG. 11. As depicted, the placement graph 1200 includes memory unit nodes labeled 'M', compute unit nodes labeled 'C', primary edges labeled 'P' and secondary edges labeled 'S'. The edges and nodes may also be annotated with additional numeric or text-based information (not shown) relevant to placement and routing. For example, edges and nodes may be annotated with a relative bandwidth or throughput metric (e.g., with values between 0.0 and 1.0). Processing the placement graph 1200 with the cluster-based placement and routing method 1100 results in four clusters 1210 corresponding to the memory units having one or more primary connections (e.g., to a compute unit). The four clusters are individually identified in FIG. 12 and elsewhere as clusters 1210A-1210D.

Figure 13A:
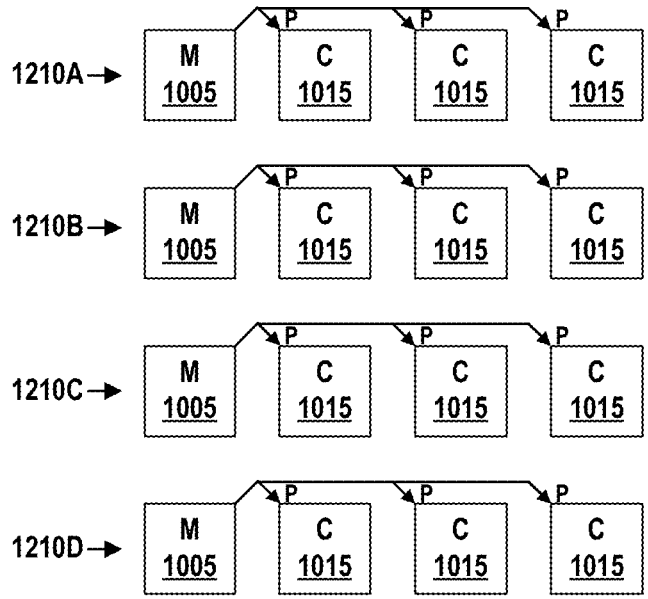
FIG. 13A depicts an example of placing and routing clusters for the placement graph of FIG. 12.

FIG. 13A depicts an example of placing and routing the clusters 1210 for the placement graph 1200. Each cluster 1210 comprises a memory unit 1005 connected to three compute units 1015 via primary connections. The depicted example places the clusters 1210 in column order and corresponds to a 'column-first' placement option.

Figure 13B:
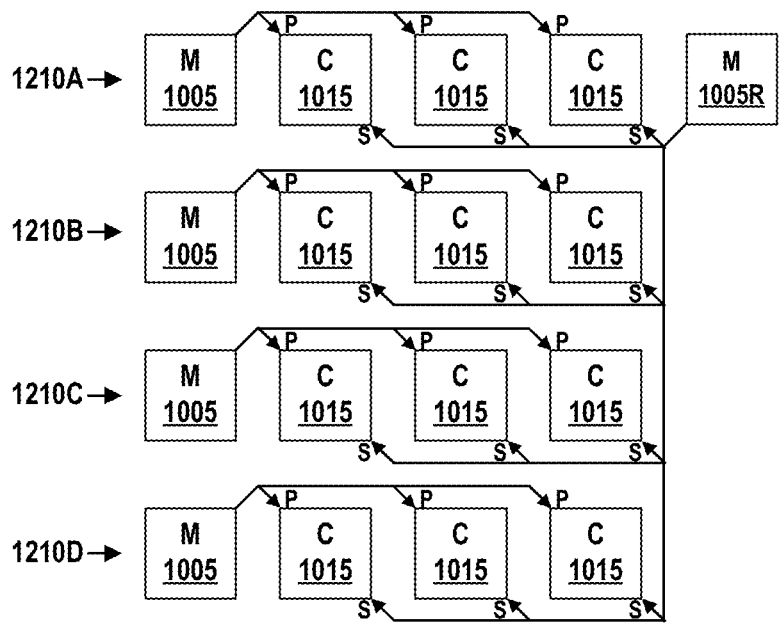
FIG. 13B depicts an example of a completed placement and routing of the placement graph of FIG. 12.

FIG. 13B depicts an example of a completed placement and routing of the placement graph 1200. The placed (column-order) clusters 1210 are augmented with any unplaced compute units and memory units (e.g., memory unit 1005R) in the placement graph. Subsequently, each of the secondary connections are routed to produce the completed placement and routing (of the placement graph 1200) shown in FIG. 13B.

Figure 14A:
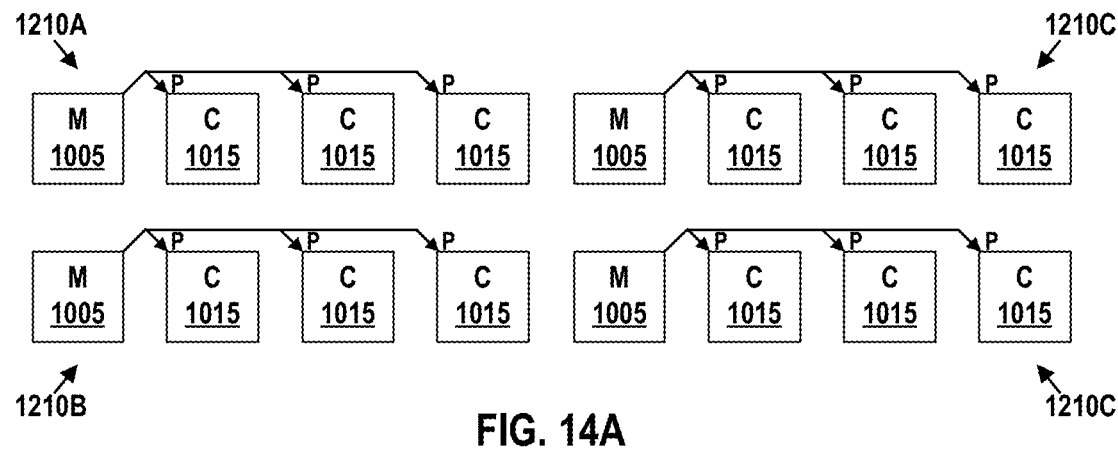
FIG. 14A depicts another example of placing and routing clusters for the placement graph of FIG. 12.

FIG. 14A depicts another example of placing and routing the clusters 1210 for the placement graph 1200. Each cluster 1210 comprises a memory unit 1005 connected to three compute units 1015 via primary connections. The depicted example places the clusters 1210 in row order and corresponds to a 'row-first' placement option.

Figure 14B:
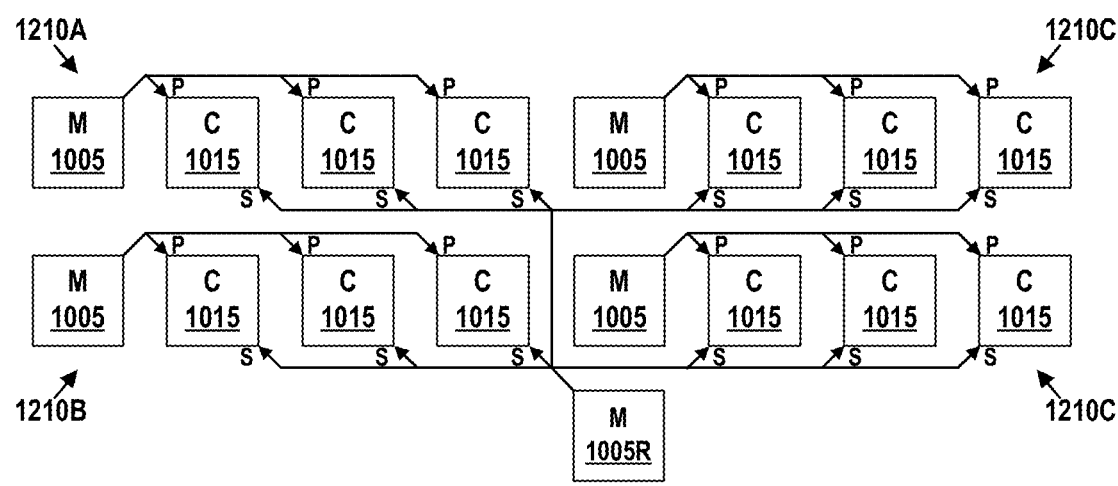
FIG. 14B depicts another example of a completed placement and routing of the placement graph of FIG. 12.

FIG. 14B depicts another example of a completed placement and routing of the placement graph 1200. The paced (row-order) clusters 1210 are augmented with any unplaced compute units and memory units (e.g., memory unit 1005R) in the placement graph. Subsequently, each of the secondary connections are routed to produce the completed placement and routing (of the placement graph 1200) shown in FIG. 14B.

Figure 15:
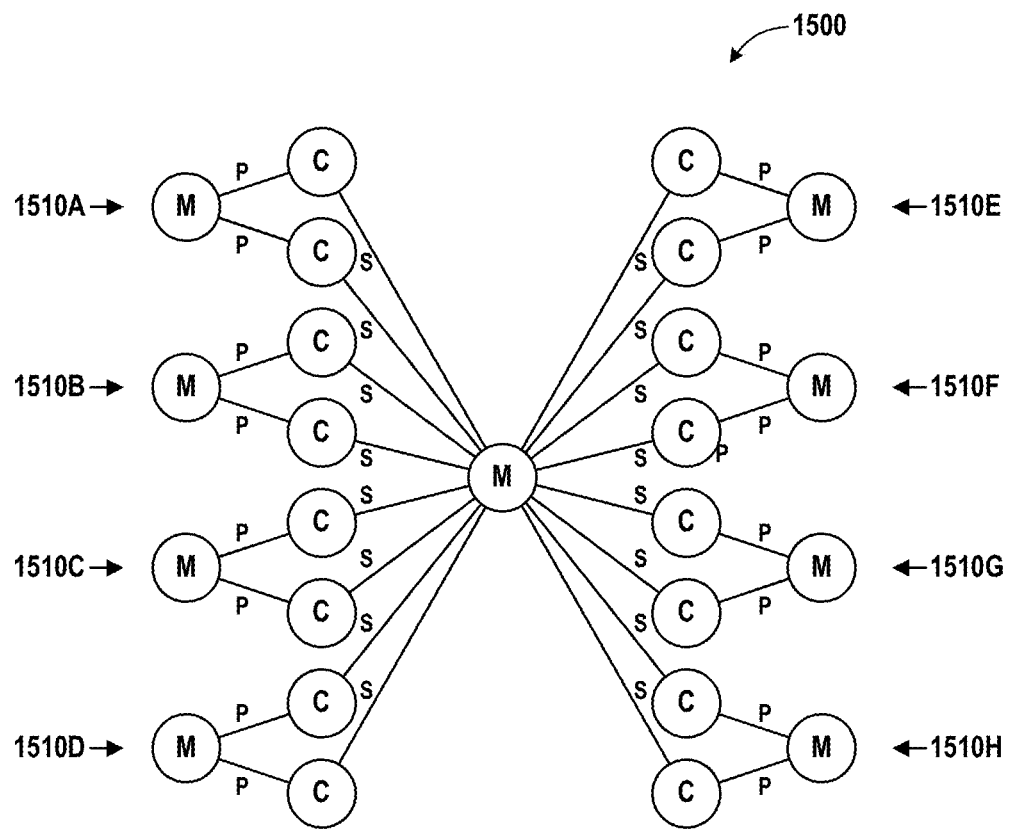
FIG. 15 depicts another example of a placement graph suitable for the placement and routing method depicted in FIG. 11.

FIG. 15 depicts another example of a placement graph (i.e., placement graph 1500) suitable for the placement and routing method 900 depicted in FIG. 9. As depicted, the placement graph 1500 includes memory unit nodes labeled 'M', compute unit nodes labeled 'C', primary edges labeled 'P' and secondary edges labeled 'S'. Processing the placement graph 1500 with the cluster-based placement and routing method 900 results in eight clusters 1510 corresponding to the memory units having one or more primary connections (e.g., to a compute unit). The eight clusters are individually identified in FIG. 15 and elsewhere as clusters 1510A-1510H.

Figure 16A:
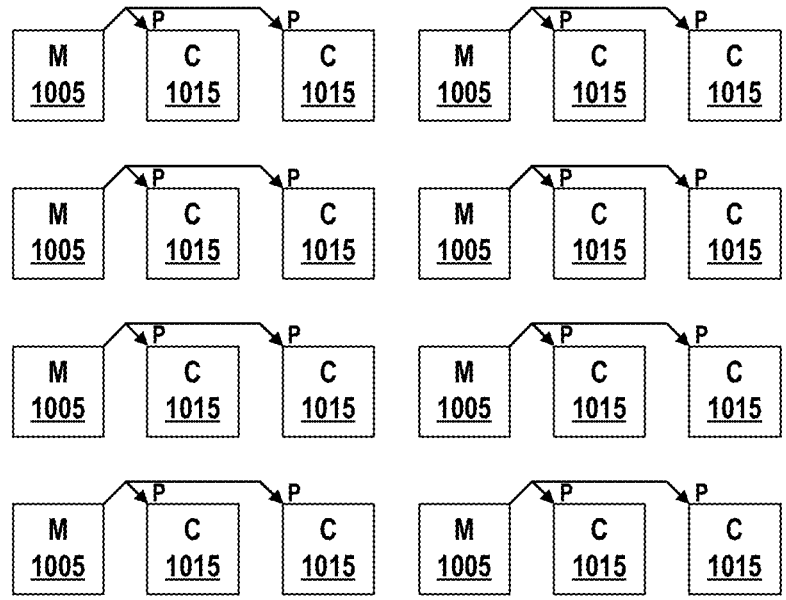
FIG. 16A depicts an example of placing and routing clusters for the placement graph of FIG. 15.

FIG. 16A depicts an example of placing and routing clusters for the placement graph 1500. Each cluster 1510 comprises a memory unit 1005 connected to two compute units 1015 via primary connections. The depicted example places the clusters 1510 in 4 rows and 2 columns resulting in 4 compute units per row and 4 compute units per column. The depicted example corresponds to a 'balanced row and column' (squarish) placement option.

Figure 16B:
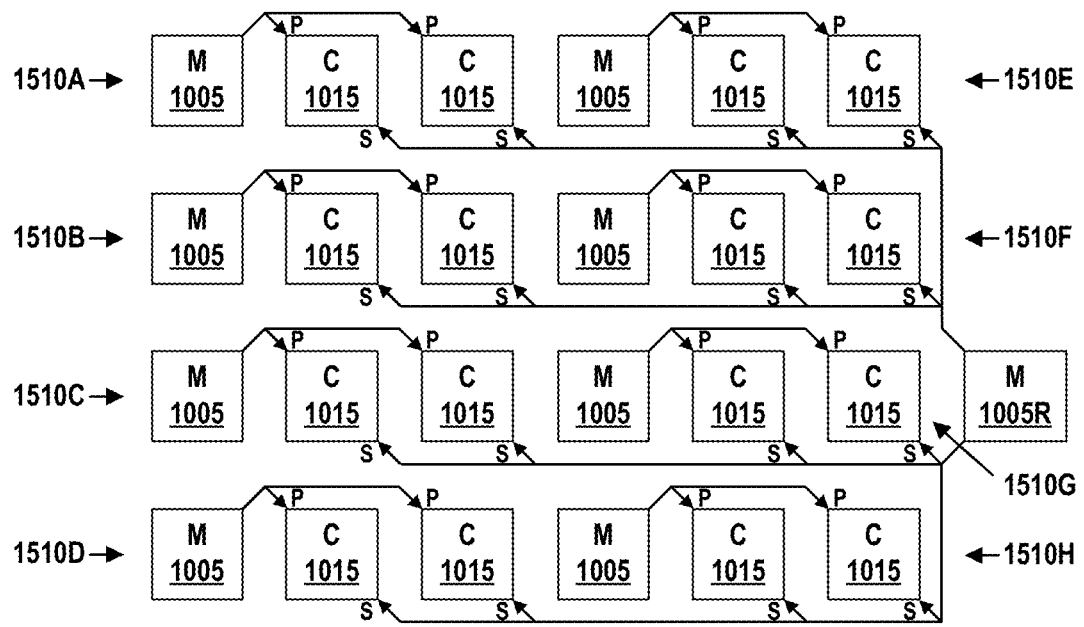
FIG. 16B depicts an example of a completed placement and routing of the placement graph of FIG. 15.

FIG. 16B depicts an example of a completed placement and routing of the placement graph 1500. The placed column-order clusters 1510 are augmented with any unplaced compute units and memory units (e.g., memory unit 1005R) in the placement graph. Subsequently, each of the secondary connections are routed to produce a completed placement and routing of the placement graph 1500.

One of skill in the art will appreciate that the described technology enables efficient placement and routing of compute graphs. The examples disclosed herein include a system for placing, routing and using compute units and memory units in a reconfigurable computing grid, the system comprising:

a reconfigurable computing grid comprising a grid of physical compute units and physical memory units interconnected with a switching fabric, each of the physical compute units comprises a primary port and one or more secondary ports a place and route module configured to receive a placement graph for a reconfigurable computing task that defines a set of unplaced memory units, a set of unplaced compute units and data connections between the unplaced memory units and the unplaced compute units, wherein the data connections comprise primary connections corresponding to the primary ports of the unplaced compute units and secondary connections corresponding to the secondary ports of the unplaced compute units the place and route module configured to form a subgraph for each unplaced memory unit having one or more primary connections, each subgraph comprising the unplaced memory unit and each unplaced compute unit connected to the unplaced memory unit via a primary connection the place and route module configured to place each formed subgraph as a cluster on the reconfigurable computing grid to produce placed clusters for the reconfigurable computing grid Optional features for the above system include:

wherein the unplaced compute units of a subgraph are placed on adjacent physical compute units of the computing grid wherein the unplaced memory unit for the subgraph is placed on a physical memory unit adjacent to one or more of the adjacent physical compute units wherein the adjacent physical compute units and the physical memory unit are on the same row or column of the reconfigurable computing grid wherein the formed subgraphs are placed on the reconfigurable computing grid according to one or more placement preferences wherein the one or more placement preferences comprise a row-first preference [fill up the rows of the reconfigurable computing grid]

wherein the one or more placement preferences comprise a column-first preference [fill up the columns of the reconfigurable computing grid]

wherein the one or more placement preferences comprise a balanced row and column preference [squarish placement]

wherein the reconfigurable computing task comprises one or more of matrix multiplication, convolution, a neural network task, a data normalization operation and a soft-max operation wherein the primary port is vector-based wherein the primary port connects to each lane of a physical compute unit and provides or receives a vector element on each lane wherein the secondary port comprises a buffer for each stage of a physical compute unit wherein each buffer broadcasts a vector element to each arithmetic unit of the corresponding stage of the physical compute unit further comprising a configuration module for configuring the reconfigurable computing grid to perform the reconfigurable computing task using the placed clusters further comprising an RDP control module for initiating data flow in the computing grid and performing the reconfigurable computing task using the placed clusters The examples disclosed herein include a method (and a corresponding computer readable medium encoded with the method) for placing, routing and using compute units and memory units in a reconfigurable computing grid, the method comprising:

providing a reconfigurable computing grid comprising a grid of physical compute units and physical memory units interconnected with a switching fabric, each of the physical compute units comprises a primary port and one or more secondary ports receiving a placement graph for a reconfigurable computing task that defines a set of unplaced memory units, a set of unplaced compute units and data connections between the unplaced memory units and the unplaced compute units, wherein the data connections comprise primary connections corresponding to the primary ports of the unplaced compute units and secondary connections corresponding to the secondary ports of the unplaced compute units forming a subgraph for each unplaced memory unit having one or more primary connections, each subgraph comprising the unplaced memory unit and each unplaced compute unit connected to the unplaced memory unit via a primary connection placing each formed subgraph as a cluster on the reconfigurable computing grid to produce placed clusters for the reconfigurable computing grid Optional features for the above method include:

wherein the unplaced compute units of a subgraph are placed on adjacent physical compute units of the computing grid wherein the unplaced memory unit for the subgraph is placed on a physical memory unit adjacent to one or more of the adjacent physical compute units wherein the adjacent physical compute units and the physical memory unit are on the same row or column of the reconfigurable computing grid wherein the formed subgraphs are placed on the reconfigurable computing grid according to one or more placement preferences wherein the one or more placement preferences comprise a row-first preference [fill up the rows of the reconfigurable computing grid]

wherein the one or more placement preferences comprise a column-first preference [fill up the columns of the reconfigurable computing grid]

wherein the one or more placement preferences comprise a balanced row and column preference [squarish placement]

wherein the reconfigurable computing task comprises one or more of matrix multiplication, convolution, a neural network task, a data normalization operation and a soft-max operation wherein the primary port is vector-based wherein the primary port connects to each lane of a physical compute unit and provides or receives a vector element on each lane wherein the secondary port comprises a buffer for each stage of a physical compute unit wherein each buffer broadcasts a vector element to each arithmetic unit of the corresponding stage of the physical compute unit wherein the plurality of packets are vector-sized packets each comprising a vector of data elements that can be processed in parallel by a compute unit configuring the reconfigurable computing grid to perform the reconfigurable computing task using the placed clusters performing the reconfigurable computing task using the placed clusters The features, advantages, and characteristics of the embodiments described herein may be combined in any suitable manner. One skilled in the relevant art will recognize that the embodiments may be practiced without one or more of the specific features or advantages of a particular embodiment. In other instances, additional features and advantages may be recognized in certain embodiments that may not be present in all embodiments.

Some of the functional units described in this specification may have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices, or the like.

Modules may also be implemented in software for execution by various types of processors. An identified module of program instructions may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

As will be appreciated by those of ordinary skill in the art, aspects of the various examples described herein may be embodied as a system, device, method, or computer program product apparatus. Accordingly, elements of the present disclosure may take the form of an entirely hardware example, an entirely software example (including firmware, resident software, micro-code, or the like) or an example combining software and hardware aspects that may all generally be referred to herein as a "apparatus," "circuit," "circuitry," "module," "computer," "logic," "FPGA," "unit," "system," or other terms. Furthermore, aspects of the various examples may take the form of a computer program product embodied in one or more computer-readable medium(s) having computer program code stored thereon. The phrases "computer program code" and "instructions" both explicitly include configuration information for a CGRA, an FPGA, or other programmable logic as well as traditional binary computer instructions, and the term "processor" explicitly includes logic in a CGRA, an FPGA, or other programmable logic configured by the configuration information in addition to a traditional processing core. Furthermore, "executed" instructions explicitly includes electronic circuitry of a CGRA, an FPGA, or other programmable logic performing the functions for which they are configured by configuration information loaded from a storage medium as well as serial or parallel execution of instructions by a traditional processing core.

Any combination of one or more computer-readable storage medium(s) may be utilized. A computer-readable storage medium may be embodied as, for example, an electronic, magnetic, optical, electromagnetic, infrared, or semiconductor system, apparatus, or device, or other like storage devices known to those of ordinary skill in the art, or any suitable combination of computer-readable storage mediums described herein. In the context of this document, a computer-readable storage medium may be any tangible medium that can contain, or store, a program and/or data for use by or in connection with an instruction execution system, apparatus, or device. Even if the data in the computer-readable storage medium requires action to maintain the storage of data, such as in a traditional semiconductor-based dynamic random-access memory, the data storage in a computer-readable storage medium can be considered to be non-transitory. A computer data transmission medium, such as a transmission line, a coaxial cable, a radio-frequency carrier, and the like, may also be able to store data, although any data storage in a data transmission medium can be said to be transitory storage. Nonetheless, a computer-readable storage medium, as the term is used herein, does not include a computer data transmission medium.

Computer program code for carrying out operations for aspects of various examples may be written in any combination of one or more programming languages, including object-oriented programming languages such as Java, Python, C++, or the like, conventional procedural programming languages, such as the "C" programming language or similar programming languages, or low-level computer languages, such as assembly language or microcode. In addition, the computer program code may be written in VHDL, Verilog, or another hardware description language to generate configuration instructions for an FPGA, CGRA IC, or other programmable logic. The computer program code if converted into an executable form and loaded onto a computer, FPGA, CGRA IC, or other programmable apparatus, produces a computer implemented method. The instructions which execute on the computer, FPGA, CGRA IC, or other programmable apparatus may provide the mechanism for implementing some or all of the functions/acts specified in the flowchart and/or block diagram block or blocks. In accordance with various implementations, the computer program code may execute entirely on the user's device, partly on the user's device and partly on a remote device, or entirely on the remote device, such as a cloud-based server. In the latter scenario, the remote device may be connected to the user's device through any type of network, including a local area network (LAN) or a wide area network (WAN), or the connection may be made to an external computer (for example, through the Internet using an Internet Service Provider). The computer program code stored in/on (i.e. embodied therewith) the non-transitory computer-readable medium produces an article of manufacture.

What is claimed is:

1. A method for placing, routing and using compute units and memory units in a reconfigurable computing grid, the method comprising:
   obtaining a hardware description of a reconfigurable computing grid comprising a grid of compute units and memory units interconnected with a switching fabric, each of the compute units comprising a primary port and one or more secondary ports;
   receiving a placement graph for a reconfigurable computing task that defines a set of unplaced memory units, a set of unplaced compute units and data connections between unplaced memory units and unplaced compute units, wherein the data connections comprise primary connections corresponding to the primary port of the unplaced compute units and secondary connections corresponding to the one or more secondary ports of the unplaced compute units;
   forming a subgraph of the placement graph for each unplaced memory unit of the set of unplaced memory units having one or more primary connections, each subgraph comprising the unplaced memory unit and each unplaced compute unit of the set of unplaced compute units connected to the unplaced memory unit via a primary connection;
   assigning each formed subgraph as a cluster on the reconfigurable computing grid to produce placed clusters for a logical representation of the reconfigurable computing grid; and
   generating a configuration file from the logical representation of the reconfigurable computing grid that, when placed into a physical reconfigurable processor comprising a physical reconfigurable computing grid corresponding to the hardware description, configures the physical reconfigurable processor to perform at least a portion of the reconfigurable computing task.

2. The method of claim 1, wherein the unplaced compute units of a subgraph are assigned to adjacent compute units of the logical representation of the reconfigurable computing grid.

3. The method of claim 2, wherein the unplaced memory unit for the subgraph is assigned to a memory unit of the logical representation of the reconfigurable computing grid adjacent to one or more of the adjacent compute units of the logical representation of the reconfigurable computing grid.

4. The method of claim 3, wherein the adjacent compute units and the memory unit are on a same row or column of the logical representation of the reconfigurable computing grid of the reconfigurable computing grid.

5. The method of claim 1, wherein the formed subgraphs are assigned to the logical representation of the reconfigurable computing grid the reconfigurable computing grid according to one or more placement preferences.

6. The method of claim 5, wherein the one or more placement preferences comprise a row-first preference.

7. The method of claim 5, wherein the one or more placement preferences comprise a column-first preference.

8. The method of claim 5, wherein the one or more placement preferences comprise a balanced row and column preference.

9. The method of claim 1, wherein the reconfigurable computing task comprises one or more of matrix multiplication, convolution, a neural network operation, a data normalization operation and a soft-max operation.

10. The method of claim 1, wherein the primary port of each of the compute units is vector-based.

11. The method of claim 1, wherein a first primary port of a first compute unit in the grid of compute units and memory units connects to each lane of the first compute unit and provides or receives a vector element on each lane.

12. The method of claim 1, wherein a first secondary port of a first compute unit in the grid of compute units and memory units comprises a buffer for each stage of the first compute unit.

13. The method of claim 1, further comprising loading the configuration file into the physical reconfigurable processor to configure the physical reconfigurable processor to perform the portion of the reconfigurable computing task using the placed clusters.

14. A system for placing and routing compute units and memory units in a reconfigurable computing grid, the system comprising:
   a hardware description of a reconfigurable computing grid comprising a grid of compute units and memory units interconnected with a switching fabric, each of the compute units comprising a primary port and one or more secondary ports;
   a place and route module configured to receive a placement graph for a reconfigurable computing task that defines a set of unplaced memory units, a set of unplaced compute units and data connections between unplaced memory units and unplaced compute units, wherein the data connections comprise primary connections corresponding to the primary port of the unplaced compute units and secondary connections corresponding to the one or more secondary ports of the unplaced compute units;
   the place and route module configured to form a subgraph of the placement graph for each unplaced memory unit of the set of unplaced memory units having one or more primary connections, each subgraph comprising the unplaced memory unit and each unplaced compute unit of the set of unplaced compute units connected to the unplaced memory unit via a primary connection;

the place and route module configured to assign each formed subgraph as a cluster on the reconfigurable computing grid to produce placed clusters for a logical representation of the reconfigurable computing grid; and a compiler configured to generate a configuration file from the logical representation of the reconfigurable computing grid that, when placed into a physical reconfigurable processor comprising a physical reconfigurable computing grid corresponding to the hardware description, configures the physical reconfigurable processor to perform at least a portion of the reconfigurable computing task.

15. The system of claim 14, wherein the unplaced compute units of a subgraph are assigned on adjacent compute units of the reconfigurable computing grid.

16. The system of claim 15, wherein the unplaced memory unit for the subgraph is assigned to a memory unit of the logical representation of the reconfigurable computing grid adjacent to one or more of the adjacent compute units of the logical representation of the reconfigurable computing grid.

17. The system of claim 15, wherein the adjacent compute units and the memory unit are on a same row or column of the logical representation of the reconfigurable computing grid of the reconfigurable computing grid.

18. The system of claim 14, further comprising a physical reconfigurable processor loaded with the configuration file configuring the physical reconfigurable processor to perform the portion of the reconfigurable computing task using the placed clusters.

19. The system of claim 14, wherein the primary port of each of the compute units is vector-based.

20. A computer program product comprising a non-transitory computer readable storage medium having program instructions embodied therewith, wherein the program instructions are executable by a processor to cause the processor to conduct a method comprising:

obtaining a hardware description of a reconfigurable computing grid comprising a grid of compute units and memory units interconnected with a switching fabric, each of the compute units comprising a primary port and one or more secondary ports;

receiving a placement graph for a reconfigurable computing task that defines a set of unplaced memory units, a set of unplaced compute units and data connections between unplaced memory units and unplaced compute units, wherein the data connections comprise primary connections corresponding to the primary port of the unplaced compute units and secondary connections corresponding to the one or more secondary ports of the unplaced compute units;

forming a subgraph of the placement graph for each unplaced memory unit of the set of unplaced memory units having one or more primary connections, each subgraph comprising the unplaced memory unit and each unplaced compute unit of the set of unplaced compute units connected to the unplaced memory unit via a primary connection;

assigning each formed subgraph as a cluster on the reconfigurable computing grid to produce placed clusters for a logical representation of the reconfigurable computing grid; and generating a configuration file from the logical representation of the reconfigurable computing grid that, when placed into a physical reconfigurable processor comprising a physical reconfigurable computing grid corresponding to the hardware description, configures the physical reconfigurable processor to perform at least a portion of the reconfigurable computing task.

* * * * *